United States Patent
Ahn et al.

(10) Patent No.: US 11,448,724 B2
(45) Date of Patent: Sep. 20, 2022

(54) ELECTRONIC DEVICE FOR DETECTING LOCATION OF USER

(71) Applicant: Samsung Electronics Co., Ltd., Gyeonggi-do (KR)

(72) Inventors: Jungho Ahn, Gyeonggi-do (KR); Yongjun Son, Gyeonggi-do (KR); Jaehwan Lee, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 162 days.

(21) Appl. No.: 16/867,837

(22) Filed: May 6, 2020

(65) Prior Publication Data
US 2020/0355790 A1 Nov. 12, 2020

(30) Foreign Application Priority Data
May 9, 2019 (KR) .......................... 10-2019-0054153

(51) Int. Cl.
| | | |
|---|---|---|
| G01S 7/28 | (2006.01) | |
| G01S 11/04 | (2006.01) | |
| G01S 13/10 | (2006.01) | |
| H01Q 17/00 | (2006.01) | |

(52) U.S. Cl.
CPC ............... G01S 7/28 (2013.01); G01S 11/04 (2013.01); G01S 13/10 (2013.01); H01Q 17/008 (2013.01)

(58) Field of Classification Search
None
See application file for complete search history.

(56) References Cited

U.S. PATENT DOCUMENTS

| | | |
|---|---|---|
| 8,830,122 B2 | 9/2014 | Menegozzi et al. |
| 10,064,077 B2 | 8/2018 | Aldana et al. |
| 10,182,360 B2 | 1/2019 | Aldana et al. |
| 10,484,899 B2 | 11/2019 | Park et al. |
| 2006/0164208 A1 | 7/2006 | Schaffzin et al. |
| 2008/0092443 A1 | 4/2008 | Herman et al. |

(Continued)

FOREIGN PATENT DOCUMENTS

| | | |
|---|---|---|
| KR | 10-2008-0078576 A | 8/2008 |
| KR | 10-2014-0040803 A | 4/2014 |

(Continued)

OTHER PUBLICATIONS

International Search Report dated Aug. 21, 2020.

*Primary Examiner* — Whitney Moore
(74) *Attorney, Agent, or Firm* — Cha & Reiter, LLC

(57) ABSTRACT

An electronic device disposed on a door frame includes a back plate attached to the door frame, a housing coupled to the back plate, a first antenna that transmits or receives a signal having a first wavelength with an external electronic device, a second antenna that is disposed closer to the back plate than the first antenna and that transmits or receives a signal having the first wavelength with the external electronic device, an electric-wave blocking member that is disposed between the back plate and the second antenna and that blocks a signal reflected by the door frame, and at least one processor operatively connected with the first antenna and the second antenna. The first antenna and the second antenna are disposed inside the housing, and an antenna pattern of the second antenna is different from an antenna pattern of the first antenna.

11 Claims, 26 Drawing Sheets

(56) References Cited

U.S. PATENT DOCUMENTS

| | | |
|---|---|---|
| 2008/0290990 A1 | 11/2008 | Schaffzin et al. |
| 2014/0112511 A1 | 4/2014 | Corbin et al. |
| 2017/0029107 A1 | 2/2017 | Emami et al. |
| 2017/0047645 A1 | 2/2017 | Lin et al. |
| 2018/0077595 A1 | 3/2018 | Park et al. |
| 2018/0084400 A1 | 3/2018 | Park et al. |
| 2018/0210075 A1 | 7/2018 | Kim et al. |
| 2019/0131691 A1* | 5/2019 | Hong .................. H01Q 1/38 |

FOREIGN PATENT DOCUMENTS

| | | |
|---|---|---|
| KR | 10-2015-0045394 A | 4/2015 |
| KR | 10-2017-0117057 A | 10/2017 |
| KR | 10-2018-0026469 A | 3/2018 |
| KR | 10-2018-0026470 A | 3/2018 |

\* cited by examiner

<713>

<702>

<801>

<802>

<901>

<902>

ELECTRONIC DEVICE FOR DETECTING LOCATION OF USER

CROSS-REFERENCE TO RELATED APPLICATION(S)

This application is based on and claims priority under 35 U.S.C. § 119 to Korean Patent Application No. 10-2019-0054153, filed on May 9, 2019, in the Korean Intellectual Property Office, the disclosure of which is incorporated by reference herein its entirety.

BACKGROUND

1. Field

One or more embodiments of the instant disclosure generally relates to an electronic device for detecting the location of a user.

2. Description of Related Art

As Internet of Things (IoT) technology and sensor technology have developed, electronic devices disposed within a building (e.g., house or office) may detect the location of their users and may provide various services. For example, one such electronic device may be disposed at a position adjacent to a door of the building and may determine whether the user is located outside or inside the building. This may be done by detecting whether the user enters or exits the building through the door. When it is determined that the user is located outside the building, the electronic device may set a security mode for preventing a third party from entering the building, or may enter a power saving mode for reducing power consumption of other IoT devices inside the building. On the other hand, when it is determined that the user is located inside the building, the electronic device may disable the security mode or the power saving mode.

The above information is presented as background information only to assist with an understanding of the disclosure. No determination has been made, and no assertion is made, as to whether any of the above might be applicable as prior art with regard to the disclosure.

SUMMARY

There are various technologies available for the detection of the user's location. For example, an electronic device may detect the user's location by wirelessly transmitting or receiving signals with an external electronic device (e.g., key device) that is carried by the user. The electronic device may detect the direction in which the external electronic device is located (or, the angle at which the external electronic device makes with a reference plane), or the distance between the electronic device and the external electronic device. These detections may be done by detecting the distance (e.g. the straight-line distance) between the electronic device and the external electronic device using the distance value (e.g., time of flight (ToF)) of the signals or by measuring the angle value (e.g., angle of arrival (AoA)) using a plurality of antennas.

The electronic device may be disposed at a position close to the door (e.g., on a door frame). In this case, the performance of the electronic device may be degraded depending on the material (e.g., metal) on which the electronic device is disposed. The ability of the electronic device to detect the user's location may be degraded due to the signal being reflected (e.g., diffusely reflected) by the material on which the electronic device is disposed.

In accordance with an aspect of the disclosure, an electronic device disposed on a door frame includes a back plate attached to the door frame, a housing coupled to the back plate, a first antenna that transmits or receives a first signal having a first wavelength with an external electronic device, a second antenna that is disposed closer to the back plate than the first antenna and that transmits or receives a second signal having the first wavelength with the external electronic device, an electric-wave blocking member that is disposed between the back plate and the second antenna and that blocks a third signal reflected by the door frame, and at least one processor operatively connected with the first antenna and the second antenna. The first antenna and the second antenna are disposed inside the housing, and an antenna pattern of the second antenna is different from an antenna pattern of the first antenna.

In accordance with another aspect of the disclosure, an electronic device disposed on a door frame includes a back plate attached to the door frame, a housing coupled to the back plate, a first antenna that transmits or receives a first signal having a first wavelength with an external electronic device, a second antenna that transmits or receives a second signal having the first wavelength with the external electronic device, an electric-wave blocking member that is disposed between the second antenna and the back plate and that blocks a third signal reflected by the door frame, and at least one processor operatively connected with the first antenna and the second antenna, and the second antenna is disposed closer to the back plate than the first antenna.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

With regard to description of the drawings, identical or similar reference numerals may be used to refer to identical or similar components.

DETAILED DESCRIPTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Aspects of the instant disclosure are to address at least the above-mentioned problems and/or disadvantages and to provide at least the advantages described below. Accordingly, an aspect of the disclosure is to provide an electronic device for uniformly detecting the location of the user irrespective of the material on which the electronic device is disposed. This may be done by blocking a signal reflected by the material through an electric-wave blocking member.

Another aspect of the disclosure is to provide an electronic device for uniformly detecting the location of the user irrespective of the material by using a plurality of antennas having asymmetrical structures.

Figure 1A:
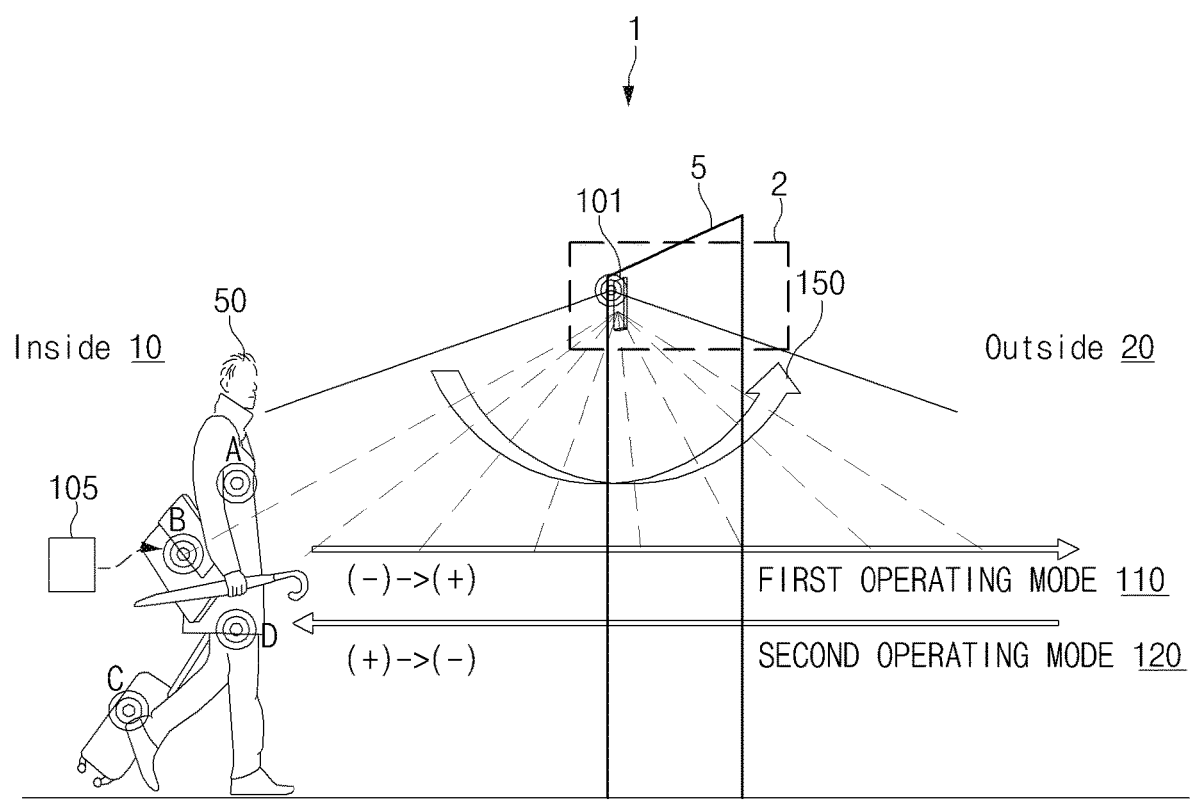
FIG. 1A is a view illustrating an operating environment for tracking the location of a user according to an embodiment.
Figure 1B:
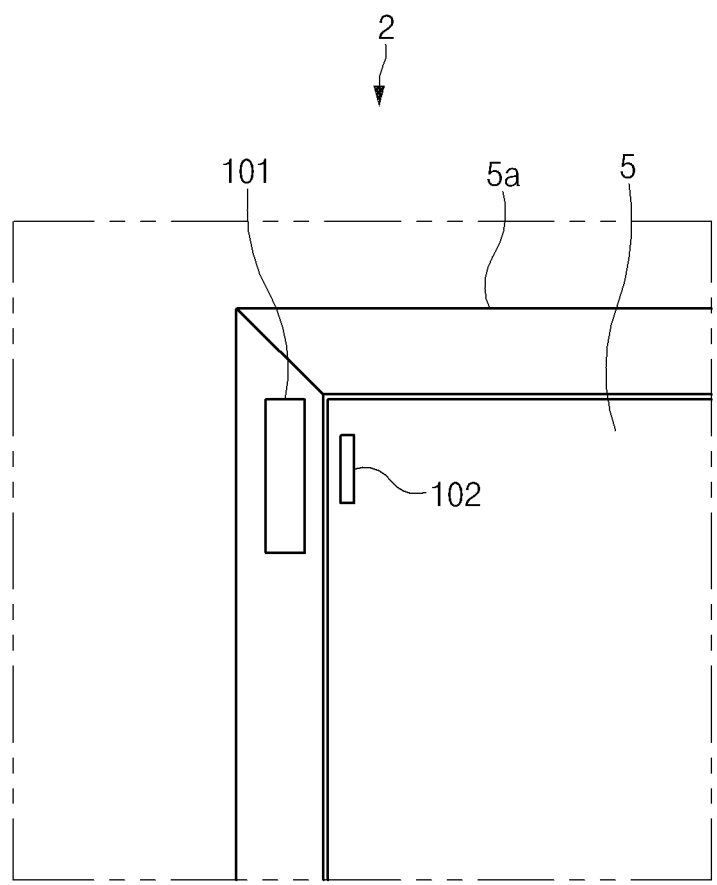
FIG. 1B is a view illustrating an electronic device disposed at a position adjacent to a door of a building according to an embodiment.

FIG. 1A is a view illustrating an operating environment 1 for tracking the location of a user 50 according to an embodiment. FIG. 1B is a view illustrating an electronic device 101 disposed at a position adjacent to a door 5 of a building according to an embodiment.

Referring to FIG. 1A, the electronic device 101 may track the location of the user 50. The electronic device 101 may be referred to as a sensor or a tracking device. According to an embodiment, the tracking operation may refer to an operation of repeatedly detecting the location of the user 50.

For example, the electronic device 101 may detect the location of an external electronic device 105 by wirelessly exchanging signals with the external electronic device 105 carried by the user 50. The location may be determined based on at least one of the distance (e.g., time of flight (ToF)) between the external electronic device 105 and the electronic device 101 and the direction (or angle) (e.g., angle of arrival (AoA)) of the external electronic device 105 with respect to the electronic device 101. The electronic device 101 may repeatedly detect the location of the external electronic device 105 by periodically transmitting or receiving signals in a specified frequency band. Because the user is carrying the external electronic device 105, the electronic device 101 may identify the location of the user 50 based on the location of the external electronic device 105.

According to an embodiment, the electronic device 101 may detect the location of the external electronic device 105 by transmitting or receiving signals in the ultra wide band (UWB). Because signals based on UWB technology has a wide frequency bandwidth and their pulses are short, the electronic device 101 may more accurately measure the location of the external electronic device 105.

According to an embodiment, the electronic device 101 may track the location of the user 50 within a specified angle range 150 (e.g., 120 degrees or 140 degrees).

According to an embodiment, the electronic device 101 may be disposed at a position adjacent to the door 5 of the building (e.g., on a door frame 5a), and may detect whether the user 50 is located inside 10 or outside 20 the building, by tracking the location of the user 50. For example, assuming that the location of the door 5 on the X axis is "0", when the location of the external electronic device 105 on the X axis is changed from a negative (−) value to a positive (+) value, the electronic device 101 may identify that the user 50 is located outside 20 the building, and when the location of the external electronic device 105 on the X axis is changed from a positive (+) value to a negative (−) value, the electronic device 101 may identify that the user 50 is located inside 10 the building.

According to an embodiment, the electronic device 101 may change an operating mode associated with the electronic device 101, depending on the location of the user 50. For example, when the user 50 (and the external electronic device 105) is located outside 20 the building, the electronic device 101 may change the operating mode to a first operating mode 110, and when the user 50 is located inside 10 the building, the electronic device 101 may change the operating mode to a second operating mode 120. The first operating mode 110 may include, for example, at least one of a security mode for preventing a third party from entering the building or a power saving mode for reducing power consumption of IoT devices disposed in the building. The second operating mode 120 may include, for example, at least one of a security release mode or a power saving release mode, in which the security mode and the power saving mode are disabled, respectively.

According to an embodiment, for battery efficiency, the electronic device 101 may trigger tracking depending on whether the door 5 is opened. For example, referring to FIG. 1B, which is an enlarged view of a partial area 2 of the door 5, the electronic device 101 may be disposed on the door frame 5*a*, and an external magnetic material 102 may be disposed on the door 5 so as to be adjacent to the electronic device 101. When the magnetic force between the external magnetic material 102 and the electronic device 101 is smaller than a threshold value (that is, when the door 5 is opened), the electronic device 101 may detect a start event of tracking and may track the location of the external electronic device 105.

According to an embodiment, the electronic device 101 may end the tracking based on a specified condition. For example, when the magnetic force between the external magnetic material 102 and the electronic device 101 is greater than or equal to the threshold value (that is, the door 5 is closed) during the tracking and the specified condition is satisfied, the electronic device 101 may detect an end event of the tracking and stop the tracking of the external electronic device 105. For example, the electronic device 101 may detect the end event for the tracking when the elapsed time after the magnetic force reaches the threshold value exceeds a reference time (e.g., 2 seconds), when the distance (the straight-line distance) between the electronic device 101 and the external electronic device 105 after the magnetic force reaches the threshold value exceeds a reference distance (e.g., 2.5 meters), or when the angle between the electronic device 101 and the external electronic device 105 after the magnetic force reaches the threshold value exceeds a reference angle (e.g., 120 degrees). As illustrated in FIG. 1*a* below, the angle between the electronic device 101 and the external electronic device 105 may be twice the incidence angle formed by a signal transmitted from the external electronic device 105 and received by an antenna of the electronic device 101.

According to an embodiment, the electronic device 101 may determine whether the user 50 is located inside 10 or outside 20, based on the detected location of the external electronic device 105 when the tracking is ended.

According to an embodiment, the external electronic device 105 may transmit signals to the electronic device 101, or may receive signals from the electronic device 101. The external electronic device 105 may be referred to as a key device. According to an embodiment, the external electronic device 105 may transmit or receive UWB signals. The electronic device 101 may change the operating mode thereof when the user 50 carrying the external electronic device 105 is located inside 10 or outside 20 the building.

According to an embodiment, the user 50 may have the external electronic device 105 in any position. For example, the user 50 may have the external electronic device 105 in a coat pocket A, a bag B, a suitcase C, or a pants pocket D. The electronic device 101 may adaptively perform the tracking depending on the location of the external electronic device 105 carried by the user 50. For example, the electronic device 101 may adjust the specified condition for detecting the end event of the tracking, based on the height of the external electronic device 105 carried by the user 50.

Figure 2:
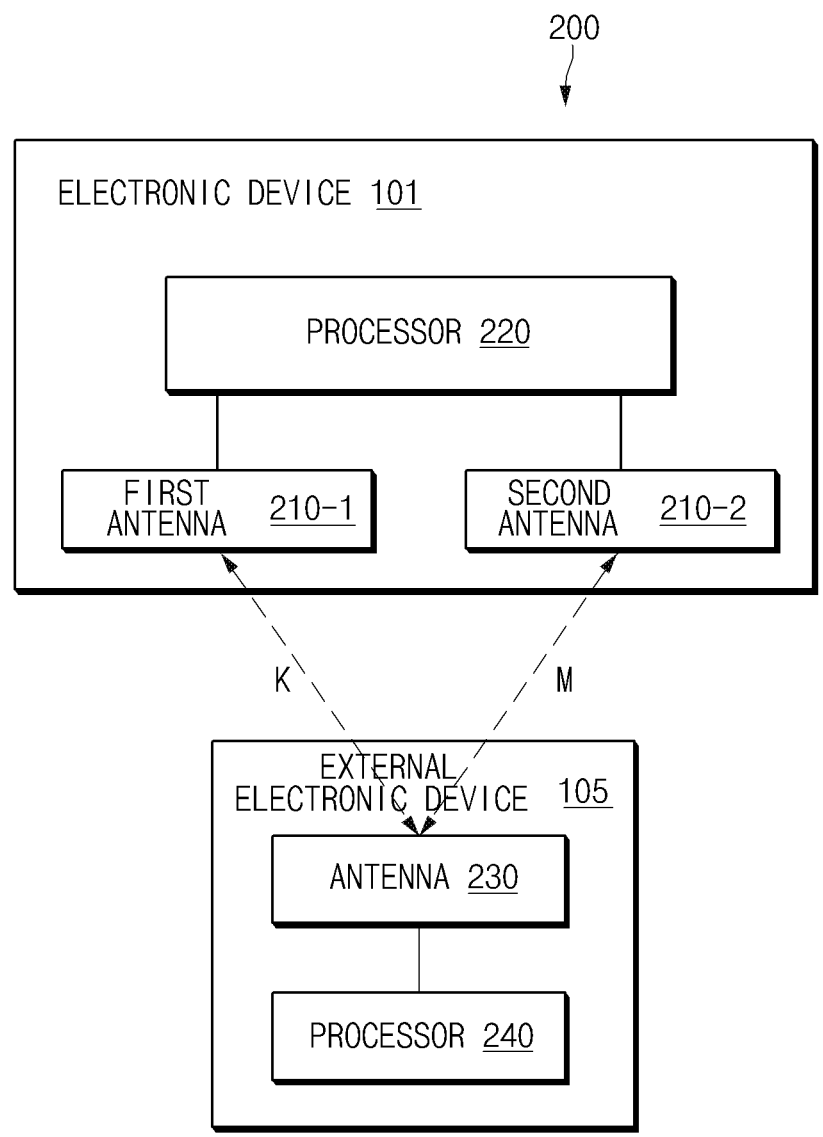
FIG. 2 is a block diagram of the electronic device and an external electronic device according to an embodiment.

FIG. 2 is a block diagram 200 of the electronic device 101 and the external electronic device 105 according to an embodiment.

Referring to FIG. 2, the electronic device 101 may include a plurality of antennas 210-1 and 210-2 and a processor 220 operatively connected with the plurality of antennas 210-1 and 210-2. The components illustrated in FIG. 2 are only an example, and the electronic device 101 may further include additional components other than the components illustrated in FIG. 2. For example, the electronic device 101 may further include at least one of components of an electronic device 1301 illustrated in FIG. 13 that will be described below. The processor 220 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, in a wireless environment, the plurality of antennas 210-1 and 210-2 may transmit signals to the external electronic device 105, or may receive signals from the external electronic device 105. The number of antennas may not be limited to those illustrated in FIG. 2. According to an embodiment, the plurality of antennas 210-1 and 210-2 may transmit or receive UWB signals in order to more accurately measure the location of the external electronic device 105.

According to an embodiment, the processor 220 may be a chip that is one processor, or a module including at least one processor. The processor 220 may control the overall functions of the electronic device 101.

According to an embodiment, the processor 220 may detect a start event for tracking caused by an external magnetic material (e.g., the external magnetic material 102 of FIG. 1B). For example, the processor 220 may detect the start event for tracking when the magnetic force between the external magnetic material and the electronic device 101 is smaller than a threshold value.

According to an embodiment, in response to the detection of the start event for tracking, the processor 220 may track the location of the external electronic device 105 through the plurality of antennas 210-1 and 210-2. For example, the processor 220 may periodically transmit or receive UWB signals (e.g., K or M) through the plurality of antennas 210-1 and 210-2. The processor 220 may obtain the distance value (e.g., ToF) between the electronic device 101 and the external electronic device 105 by using the distance value of the signals, or may obtain the angle value (e.g., AoA) between the electronic device 101 and the external electronic device 105 through a phase difference between the plurality of signals.

According to an embodiment, while the tracking is performed, the processor 220 may obtain the height value of the external electronic device 105 and may adjust the specified conditions for ending tracking based on the obtained height value. For example, the processor 220 may change at least one of the reference time, the reference distance, or the reference angle based on the height value.

When the location of the external electronic device 105 deviates from a specified angle range (e.g., the specified angle range 150 of FIG. 1A) according to an embodiment, the processor 220 may estimate the angle value for the external electronic device 105 using the distance value without having to measure the actual angle.

When an end event of the tracking is detected according to an embodiment, the processor 220 may change an operating mode associated with the electronic device 101.

According to an embodiment, to inform the user 50 of the change of the operating mode, the processor 220 may provide, to the user 50, a user interface that represents that the operating mode is changed. For example, the processor 220 may output at least one of light, sound, or vibration through an output device (e.g., at least one of the display device 1360, the sound output device 1355, or the haptic module 1379 of FIG. 13). In another example, the processor 220 may transmit data representing the change of the operating mode to the external electronic device 105 carried by the user 50, thereby notifying the user 50 of the change of the operating mode.

According to an embodiment, the external electronic device 105 may include an antenna 230 and a processor 240. The antenna 230 may perform functions that are the same as, or similar to, the functions of the plurality of antennas 210-1 and 210-2 included in the electronic device 101. The processor 240 may process signals transmitted or received through the antenna 230.

Figure 3A:
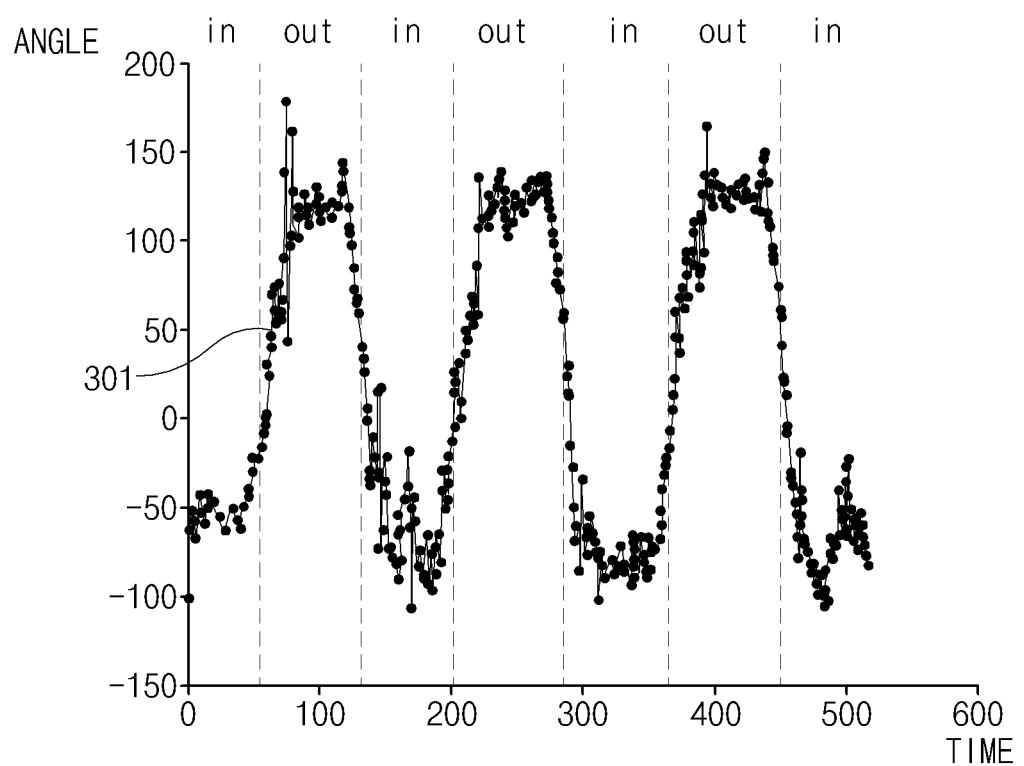
FIG. 3A is a graph depicting a normal tracking operation of the electronic device according to an embodiment.
Figure 3B:
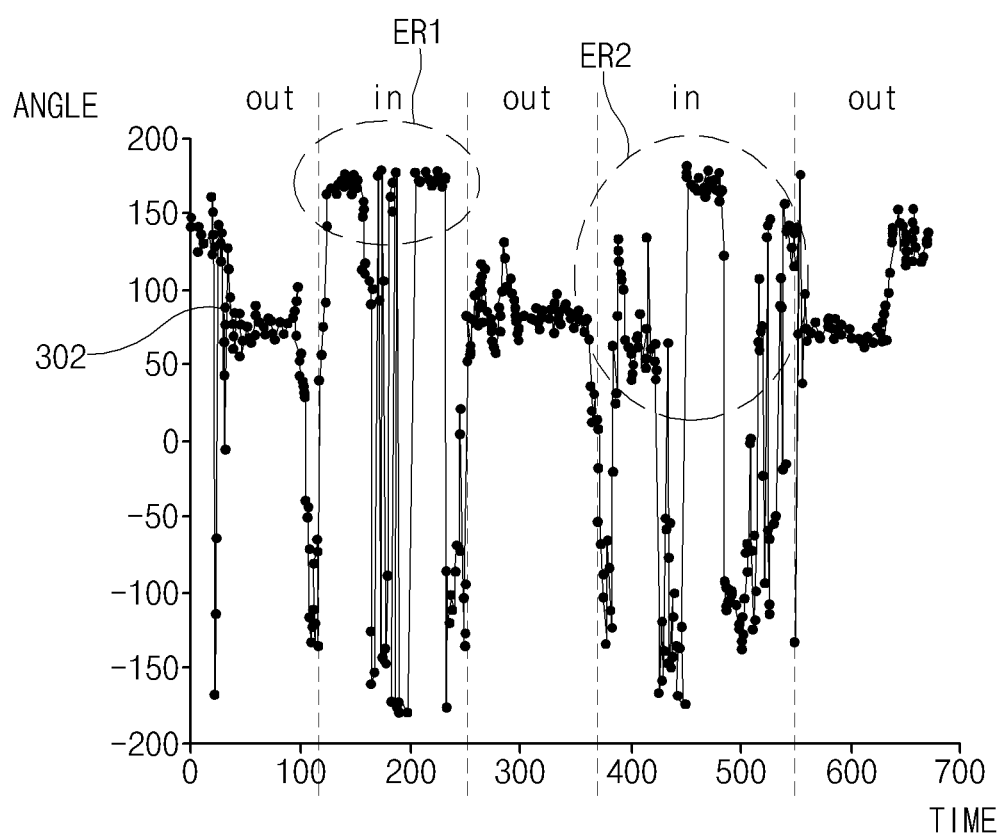
FIG. 3B is a graph depicting a tracking operation of the electronic device that includes an error according to an embodiment.

FIG. 3A is a graph depicting a normal tracking operation of the electronic device according to an embodiment. FIG. 3B is a graph depicting a tracking operation of the electronic device that includes an error according to an embodiment. The graphs 301 and 302 of FIGS. 3A and 3B represent the angle values (e.g., AoA) between the electronic device 101 and the external electronic device 105 when the external electronic device 105 repeatedly enters and exits the building through the door 5 in the operating environment 1 of FIGS. 1A and 1B.

Referring to FIGS. 1A to 3B, the electronic device 101 may be disposed on the door frame 5a. However, the electronic device may be disposed in other places. The electronic device 101 may malfunction depending on the material of the door frame 5a. In the case where the door frame 5a is made of a material (e.g., wood, stone, or plastic) that does not reflect electric waves well, the electronic device 101 may normally operate using conventional antenna arrangements (e.g., the plurality of antennas 210-1 and 201-2 having the same structure and being symmetrical). However, in the case where the door frame 5a is made of a material (e.g., metal) that reflects electric waves well, the electronic device 101 may malfunction when using such an antenna arrangement. For example, the plurality of antennas 210-1 and 210-2 may directly receive signals transmitted from the external electronic device 105. The antenna (e.g., the second antenna 210-2) that is closer to the door frame 5a may receive a signal (e.g., a diffusely reflected signal) that is reflected by the door frame 5a. Accordingly, the signal directly received by the antenna closer to the door frame 5a from the external electronic device 105 and the signal reflected by the door frame 5a may interfere with each other, and therefore the processor 220 may fail to obtain the exact angle value (e.g., AoA) or the exact distance value (e.g., ToF) between the electronic device 101 and the external electronic device 105.

Referring to the graph 301 of FIG. 3A, in the case where the door frame 5a is made of a material that does not reflect electric waves well (e.g., in the case of a normal tracking operation), the angle values (e.g., AoA) between the electronic device 101 and the external electronic device 105 may be measured to be angle values having opposite signs such that the angle values measured inside (e.g., inside 10) are clearly distinguished from the angle values measured outside (e.g., outside 20). For example, the angle values (e.g., AoA) between the electronic device 101 and the external electronic device 105 that are measured inside may have a negative (−) sign. The angle values (e.g., AoA) between the electronic device 101 and the external electronic device 105 that are measured outside may have a positive (+) sign.

Referring to the graph 302 of FIG. 3B, in the case where the door frame 5a is made of a material that reflects electric waves well (e.g., in the case of a tracking operation including errors), the angle values (e.g., AoA) between the electronic device 101 and the external electronic device 105 may be measured to be angle values by which the inside and the outside are not clearly distinguished from each other. For example, in the case where the angle values (e.g., AoA) between the electronic device 101 and the external electronic device 105 that are measured inside have a positive (+) sign (e.g., when the angle values include first errors ER1 and second errors ER2), the electronic device 101 may fail to clearly distinguish that the external electronic device 105 is on the inside and the outside.

According to an embodiment, the electronic device 101 may prevent the errors ER1 and ER2 described above with reference to FIG. 3B, by disposing an electric-wave blocking member between the door frame 5a and the antennas or by using asymmetrical antennas. Methods for preventing the errors ER1 and ER2 described above will be described below with reference to FIGS. 4 to 10B.

Figure 4:
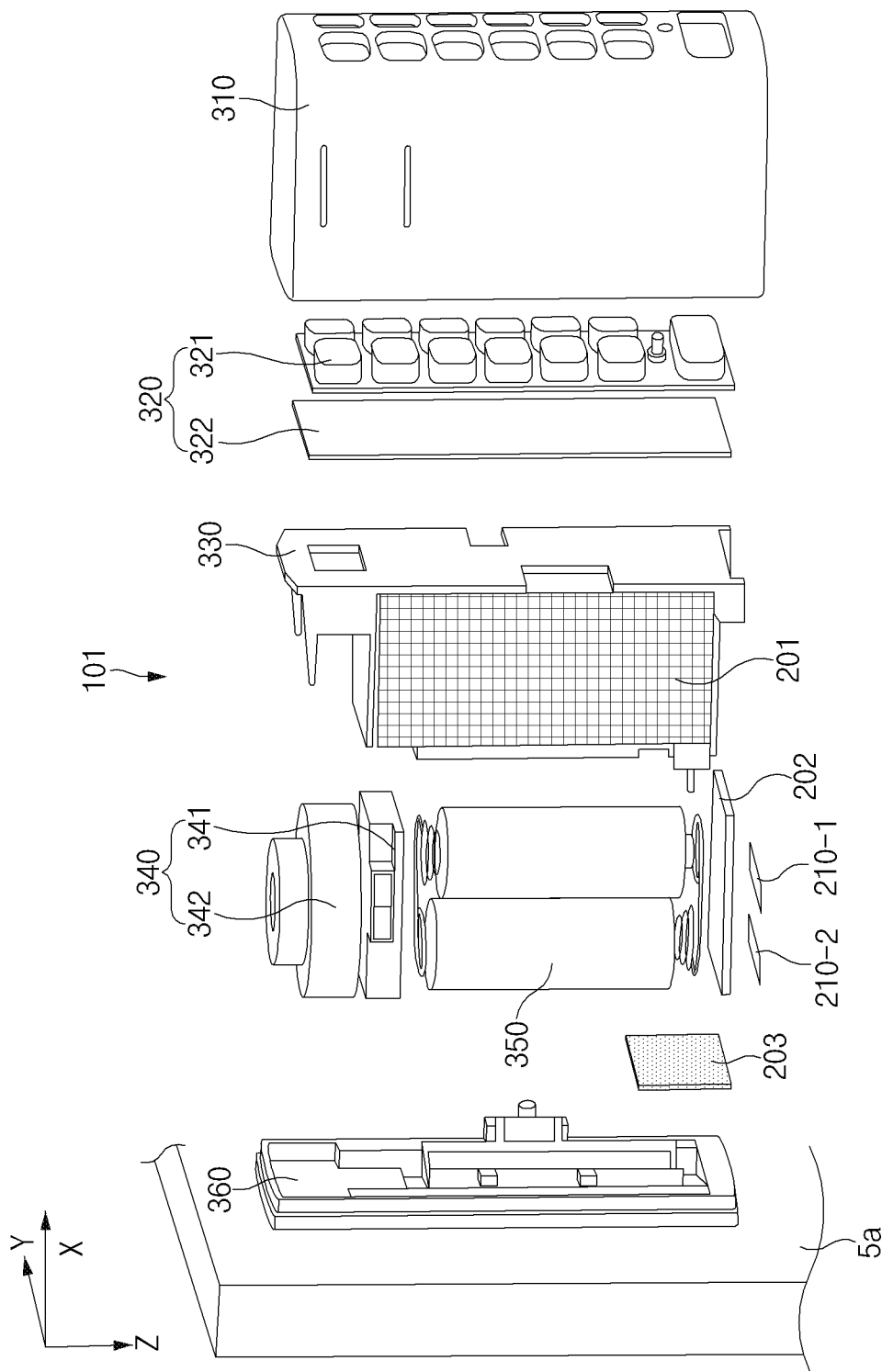
FIG. 4 is an exploded perspective view of the electronic device according to an embodiment.

FIG. 4 is an exploded perspective view of the electronic device according to an embodiment.

Referring to FIG. 4, the electronic device 101 may include a housing 310, an input device 320, a support member 330, a main printed circuit board (PCB) 201, an antenna substrate 202, the plurality of antennas 210-1 and 210-2, an electric-wave blocking member 203, at least one output device 340, a battery 350, or a back plate 360. The input device 320 may include a keypad 321 and a keypad PCB 322. The output device 340 may include a speaker 341 or a siren 342. The output device 340 may further include additional components not illustrated in FIG. 4.

According to an embodiment, a processor (e.g., the processor 220) that controls the overall functions of the electronic device 101 may be mounted on the main PCB 201. The main PCB 201 may be operatively connected with the antenna substrate 202.

According to an embodiment, the plurality of antennas 210-1 and 210-2 may be mounted on the antenna substrate 202. The plurality of antennas 210-1 and 210-2 may be operatively connected to the processor mounted on the main PCB 201. The processor may perform, through the plurality of antennas 210-1 and 210-2, the operations described above with reference to FIGS. 1A, 1B, and 2.

According to an embodiment, as described above with reference to FIG. 2, the processor may track the location of an external electronic device (e.g., the external electronic device 105) through the plurality of antennas 210-1 and 210-2. For example, the processor may periodically transmit or receive UWB signals (e.g., K or M of FIG. 2) through the plurality of antennas 210-1 and 210-2. The processor may obtain the distance value (e.g., ToF) between the electronic device 101 and the external electronic device by using the distance values of a plurality of signals, or may obtain the angle value (e.g., AoA) between the electronic device 101 and the external electronic device by using the angle values of the plurality of signals. To obtain the distance value (e.g., ToF) or the angle value (e.g., AoA), the plurality of antennas 210-1 and 210-2 may generally have the same structure. The plurality of antennas 210-1 and 210-2 may be disposed on the antenna substrate 202 at a specific interval (e.g., half-wavelength or quarter-wavelength of the signals used).

According to an embodiment, the electronic device 101 may be disposed on a portion (e.g., the door frame 5a) of a door (e.g., the door 5 of FIG. 1A) of a building. However, the electronic device 101 may malfunction due to the material of the door frame 5a. In the case where the door frame 5a is made of a material (e.g., wood, stone, or plastic) that does not reflect electric waves well, the electronic device 101 may normally operate even when the antennas have generally the same structure. However, in the case where the door frame 5a is made of a material (e.g., metal) that reflects electric waves well, the electronic device 101 may malfunction when using antennas that generally have the same structure. For example, the first antenna 210-1 and the second antenna 210-2 may directly receive a signal transmitted from the external electronic device. Furthermore, the second antenna 210-2 closer to the door frame 5a may receive a signal (e.g., a diffusely reflected signal) that is reflected by the door frame 5a. Accordingly, the signal directly received by the second antenna 210-2 from the external electronic device and the signal reflected by the door frame 5a may interfere with each other, and therefore the processor may fail to obtain the exact distance value (e.g., ToF) or the exact angle value (e.g., AoA).

According to an embodiment, the electronic device 101 may include the electric-wave blocking member 203 to prevent the signal reflected by the door frame 5a from being received to the second antenna 210-2. For example, the electric-wave blocking member 203 may be disposed between the second antenna 210-2 and the door frame 5a.

According to an embodiment, the structure of the second antenna 210-2 may be different from the structure of the first antenna 210-1. For example, the structure of the second antenna 210-2 may be changed in consideration of the signal reflected by the door frame 5a. The electronic device 101 may include the first antenna 210-1 and the second antenna structure 210-2 that have asymmetrical structures, and may obtain the exact distance value (e.g., ToF) or the exact angle value (e.g., AoA).

According to an embodiment, the back plate 360 may be attached to the door frame 5a. The electric-wave blocking member 203 may be disposed between the back plate 360 and the antenna substrate 202 (or the second antenna 210-2). The electric-wave blocking member 203 may block the signal reflected by the door frame 5a. For example, the electric-wave blocking member 203 may include an absorber that absorbs signal in a particular frequency band (e.g., about 6 GHz) that is used by the plurality of antennas 210-1 and 210-2.

FIGS. 5A to 5D are views illustrating various examples of the electric-wave blocking member included in the electronic device according to various embodiments. Referring to FIGS. 5A to 5D, the electric-wave blocking member 203 may be disposed between the back plate 360 and the antenna substrate 202 (or the second antenna 210-2). In FIGS. 5A to 5D, it is assumed that the door frame 5a is made of a material (e.g., metal) that reflects electric waves well. FIGS. 5A to 5D illustrate the electronic device 101 when viewed in the Y-axis direction of FIG. 4 (e.g., viewed from the left to right of FIG. 4 when the electronic device 101 is installed on the door frame 5a).

Figure 5A:
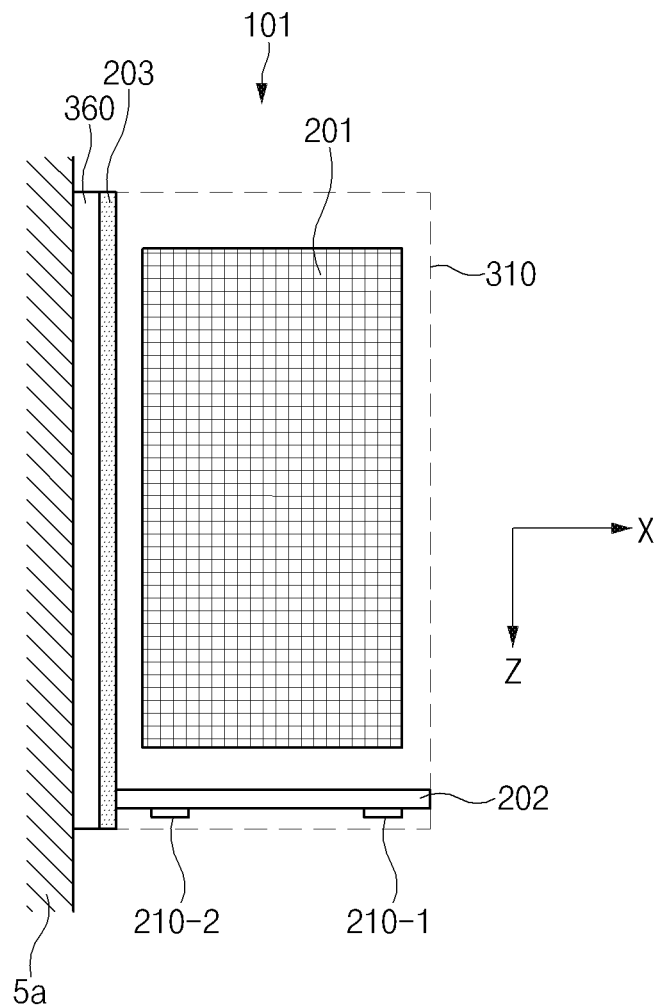
FIG. 5A is a view illustrating one example of an electric-wave blocking member included in the electronic device according to an embodiment.

According to an embodiment, in FIG. 5A, the electric-wave blocking member 203 may be in a size that is the same as, or similar to, the size of the back plate 360. When this is the case, signals reflected by the door frame 5a may be mostly blocked. In this case, the electronic device 101 may normally operate with the first antenna 210-1 and the second antenna 210-2 having symmetrical structures, similar to when the door frame 5a is made of a material (e.g., wood, stone, or plastic) that does not reflect electric waves well.

Figure 5B:
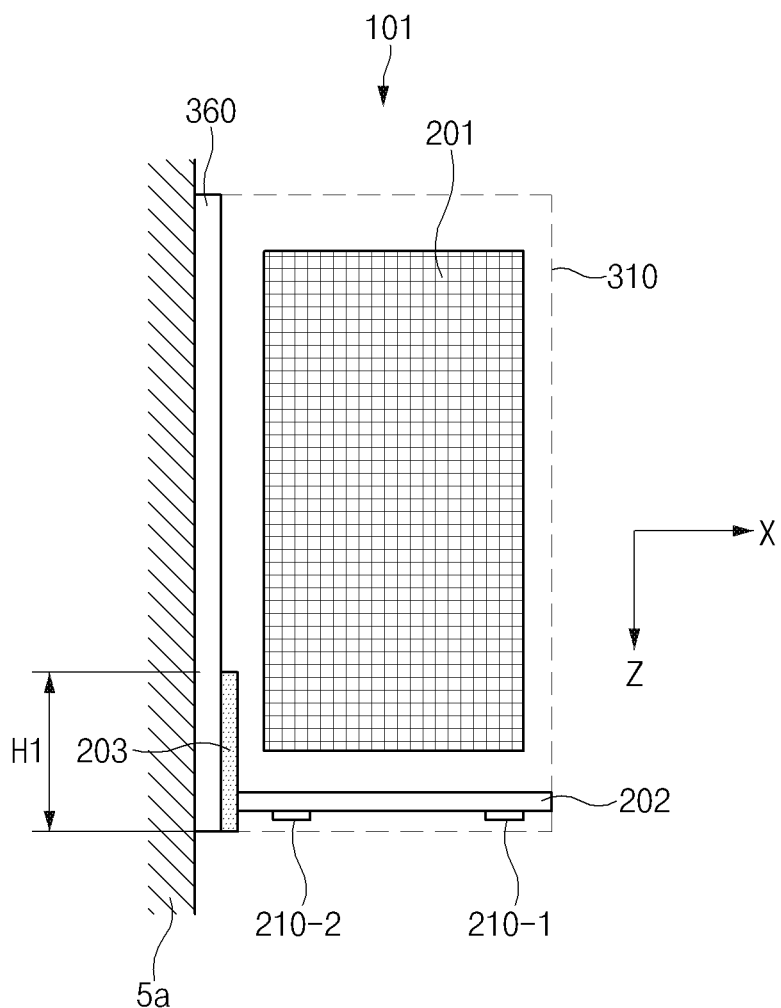
FIG. 5B is a view illustrating another example of the electric-wave blocking member included in the electronic device according to an embodiment.

According to an embodiment, in FIG. 5B, the electric-wave blocking member 203 may be formed to have a specific size smaller than the size of the back plate 360. For example, the electric-wave blocking member 203 may be formed to have a first height H1. The width of the electric-wave blocking member 203 may be the same as, or similar to, the width of the back plate 360.

According to an embodiment, the first height H1 may be the same as, or similar to (e.g., within ±10% difference from the wavelength), the wavelength (e.g., about 46 mm) of signals used between the electronic device 101 and the external electronic device. In another embodiment, the first height H1 may be the same as, or similar to (e.g., within ±10% difference from half of the wavelength), half (e.g., about 23 mm) of the wavelength. In another embodiment, the first height H1 may be the same as, or similar to (e.g., within ±10% difference from a quarter of the wavelength), a quarter (e.g., about 11.5 mm) of the wavelength.

According to the embodiments of FIG. 5B, the antenna pattern of the second antenna 210-2 may be formed to be different from the antenna pattern of the first antenna 210-1. For example, when the electric-wave blocking member 203 is smaller than the back plate 360, the electric-wave blocking member 203 cannot completely block signals reflected by the door frame 5a. Depending on the influence of signals reflected by the electric-wave blocking member 203 and the partially-blocked door frame 5a, the radiation pattern of the second antenna 210-2 may be deformed to be different from that of the first antenna 210-1. Based on the deformed radiation pattern, the second antenna 210-2 may be formed in a different antenna pattern from the first antenna 210-1.

Figure 5C:
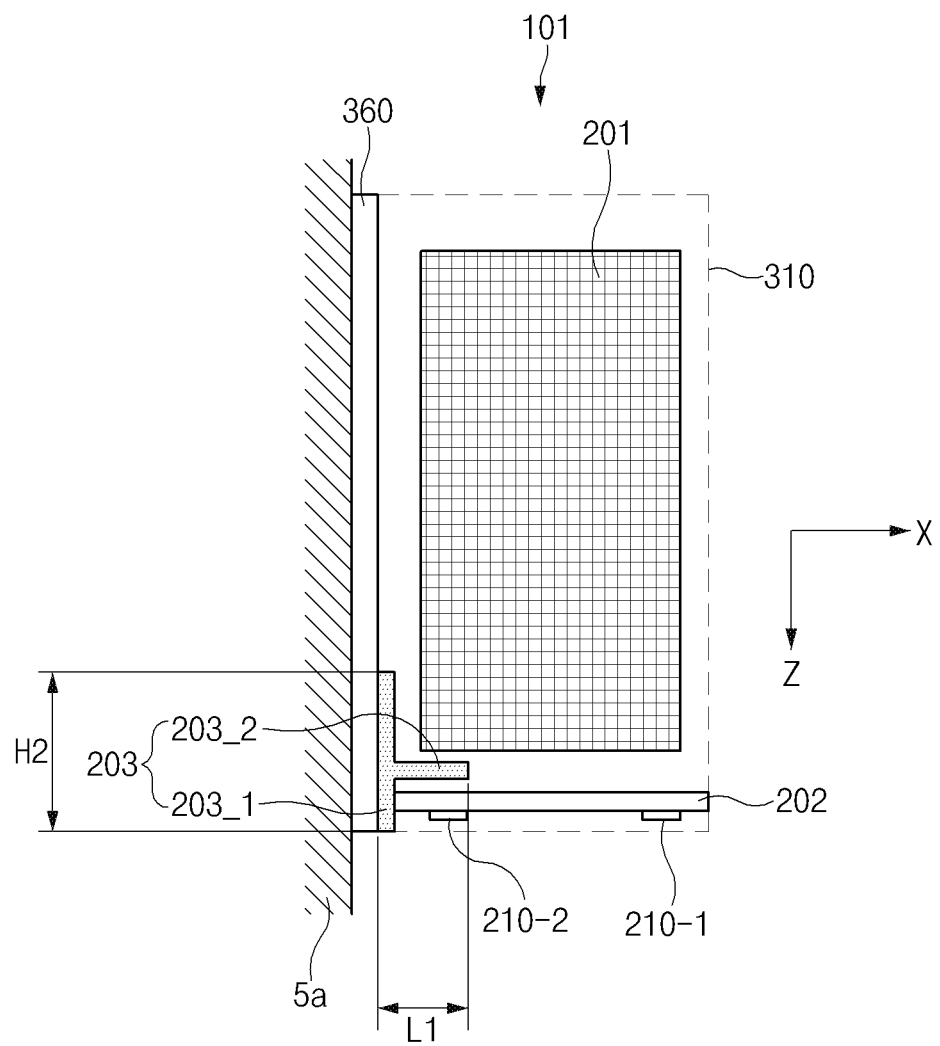
FIG. 5C is a view illustrating yet another example of the electric-wave blocking member included in the electronic device according to an embodiment.

According to an embodiment, in FIG. 5C, the electric-wave blocking member 203 may be disposed to have a specific shape (e.g., the shape of "T"). For example, the electric-wave blocking member 203 may include a first portion 203_1 extending in the Z-axis direction and a second portion 203_2 extending from one point of the first portion 203_1 in the X-axis direction. The first portion 203_1 may be disposed between the back plate 360 and the antenna substrate 202 (or the second antenna 210-2). The second portion 203_2 may be disposed between the main PCB 201 and the antenna substrate 202 (or the second antenna 210-2). According to an embodiment, the first portion 203_1 may be formed to have a second height H2. The second height H2 may be equal to or smaller than the first height H1 of FIG. 5B. The second portion 203_2 may be formed to have a first length L1. The first length L1 may be determined in consideration of the signals reflected by the door frame 5a that are not blocked by the first portion 203_1. According to an embodiment, the width of the electric-wave blocking member 203 may be set to be the same as, or similar to, the width of the back plate 360.

According to the embodiments of FIG. 5C, the antenna pattern of the second antenna 210-2 may be formed to be different from the antenna pattern of the first antenna 210-1. For example, the electric-wave blocking member 203 including the first portion 203_1 and the second portion 203_2 cannot completely block the signal reflected by the door frame 5a. Depending on the influence of signals reflected by the electric-wave blocking member 203 and the partially-blocked door frame 5a, the radiation pattern of the second antenna 210-2 may be deformed to be different from that of the first antenna 210-1. Based on the deformed radiation pattern, the second antenna 210-2 may be formed in a different antenna pattern from the first antenna 210-1.

Figure 5D:
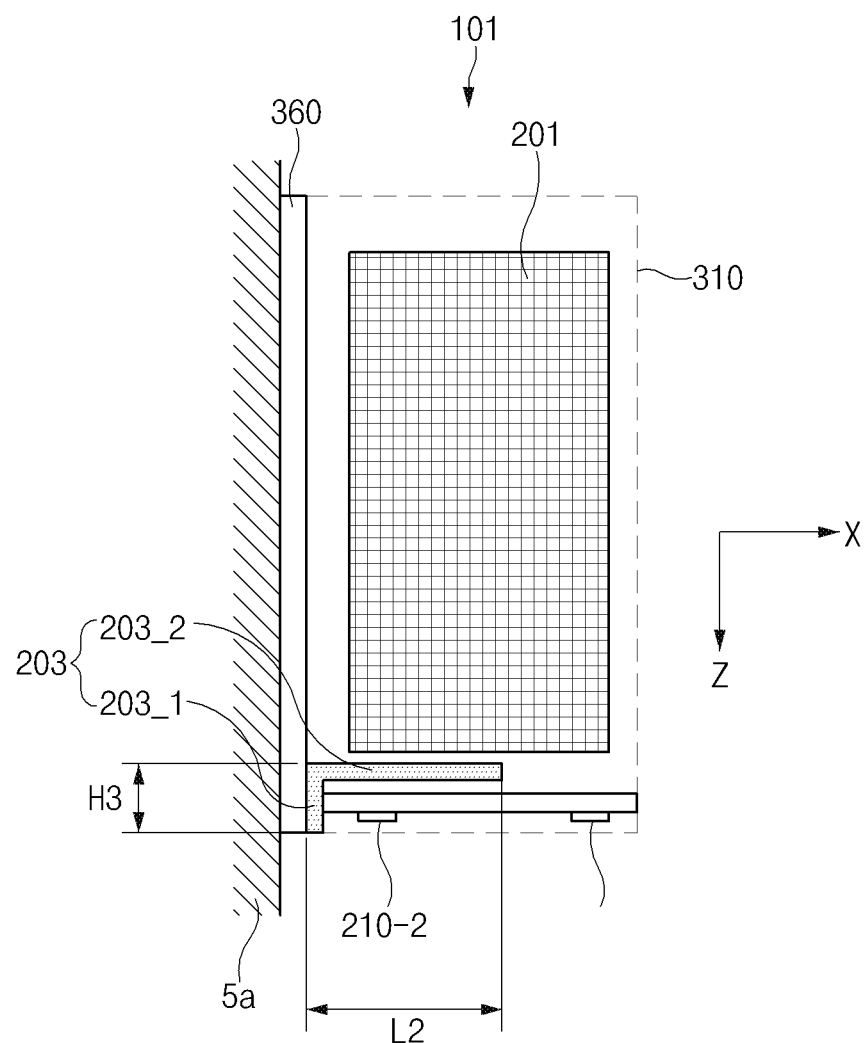
FIG. 5D is a view illustrating still another example of the electric-wave blocking member included in the electronic device according to an embodiment.

According to an embodiment, in FIG. 5D, the electric-wave blocking member 203 may be disposed to have a specific shape (e.g., the shape of rotated "L"). For example, the electric-wave blocking member 203 may include a first portion 203_1 extending in the Z-axis direction and a second portion 203_2 extending from one end of the first portion 203_1 in the X-axis direction. The first portion 203_1 may be disposed between the back plate 360 and the antenna substrate 202 (or the second antenna 210-2). The second portion 203_2 may be disposed between the main PCB 201 and the antenna substrate 202 (or the second antenna 210-2). According to an embodiment, the first portion 203_1 may be formed to have a third height H3. The third height H3 may be set to be smaller than the second height H2 of FIG. 5C. The second portion 203_2 may be formed to have a second length L2. The second length L2 may be set to be greater than the first length L1 of FIG. 5C. The second length L2 may be determined in consideration of signals reflected by the door frame 5a. According to an embodiment, the width of the electric-wave blocking member 203 may be set to be the same as, or similar to, the width of the back plate 360.

According to the embodiments of FIG. 5D, the antenna pattern of the second antenna 210-2 may be formed to be different from the antenna pattern of the first antenna 210-1. For example, the electric-wave blocking member 203 including the first portion 203_1 and the second portion 203_2 cannot completely block the signal reflected by the door frame 5a. Depending on the influence of signal reflected by the electric-wave blocking member 203 and the partially-blocked door frame 5a, the radiation pattern of the second antenna 210-2 may be deformed to be different from that of the first antenna 210-1. Based on the deformed radiation pattern, the second antenna 210-2 may be formed in a different antenna pattern from the first antenna 210-1.

According to the various different embodiments shown in FIGS. 5A to 5D, the second antenna 210-2 may be disposed to be spaced apart from the door frame 5a by a specified separation distance. For example, the separation distance may be experimentally determined depending on the degree of diffused reflection by the door frame 5a. The separation distance may be changed depending on the size of the electric-wave blocking member 203. For example, as the size of the electric-wave blocking member 203 increases, the separation distance may decrease. Alternatively, as the size of the electric-wave blocking member 203 decreases, the separation distance may increase. For example, in the case where the height (e.g., H1, H2, or H3) of the electric-wave blocking member 203 is smaller than or equal to a specified reference value, the separation distance may be set to be the specified reference distance or more. In one example, in the case where the height of the electric-wave blocking member 203 is equal to the height of the back plate 360, the separation distance may be set to a first distance (e.g., about 17 mm). In the case where the height of the electric-wave blocking member 203 is equal to the wavelength (e.g., about 46 mm) of signals used in the electronic device 101, the separation distance may be set to a second distance (e.g., about 8.6 mm) that is smaller than or equal to half the first distance. In the case where the height of the electric-wave blocking member 203 is equal to half (e.g., about 23 mm) of the wavelength of the signal used in the electronic device 101, the separation distance may be set to a third distance (e.g., about 10.8 mm) that is smaller than the first distance and greater than the second distance.

Figure 6A:
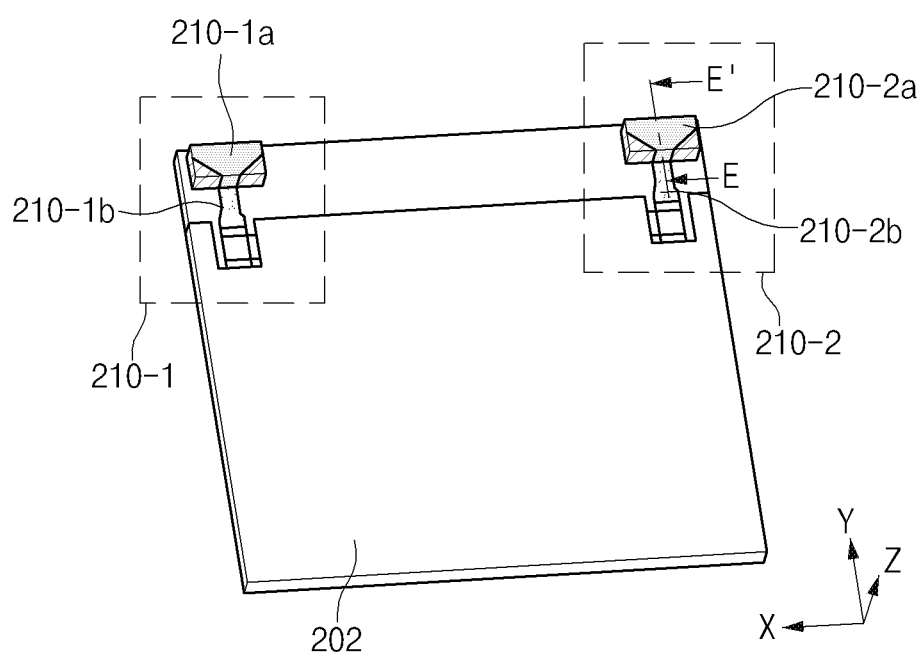
FIG. 6A is a view illustrating a general embodiment of a plurality of antennas of an electronic device according to an embodiment.
Figure 6B:
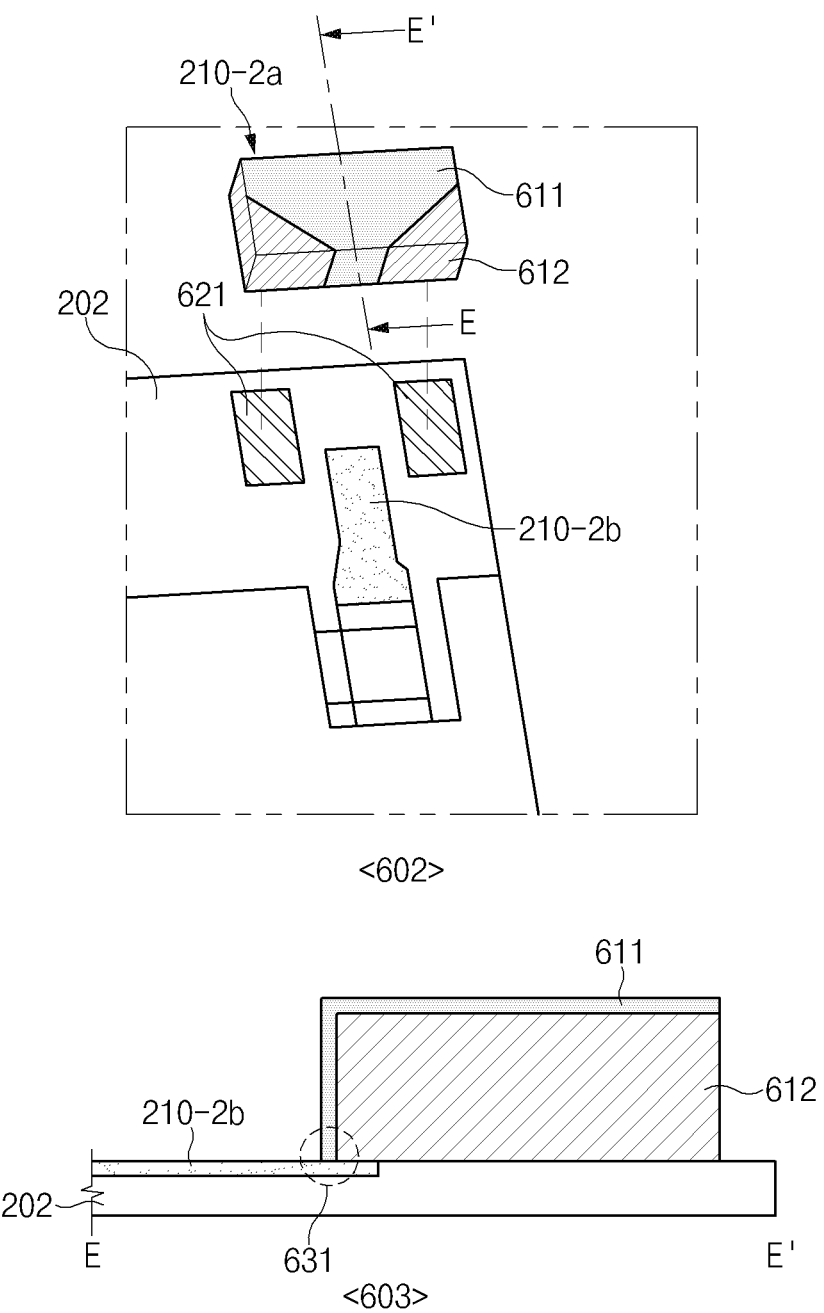
FIG. 6B is a detailed view illustrating a second antenna of FIG. 6A.

FIG. 6A is a view illustrating a general embodiment of a plurality of antennas of an electronic device according to an embodiment. FIG. 6B is a detailed view illustrating a second antenna of FIG. 6A.

Referring to FIGS. 6A and 6B, the electronic device (e.g., the electronic device 101) may include the first antenna 201-1 and the second antenna 210-2 that have the same structure. For example, the first antenna 210-1 and the second antenna 210-2 may be disposed on one surface of the antenna substrate 202 (e.g., a surface facing the Z-axis direction or a surface facing toward the bottom of the electronic device). In this example, the first antenna 210-1 and the second antenna 210-2 may be disposed on a portion of the antenna substrate 202 so as to be adjacent to one edge of the antenna substrate 202. The first antenna 210-1 and the second antenna 210-2 may be disposed to be spaced apart from each other at a specific interval (e.g., half-wavelength or quarter-wavelength of the signals used in the electronic device). When the electronic device is attached to a door frame (e.g., the door frame 5a), the second antenna 210-2 may be disposed closer to the door frame than the first antenna 210-1 (refer to FIG. 4). 601 is a perspective view of the first antenna 210-1 and the second antenna 210-2 when viewed in the Z-axis direction.

In FIG. 6B, 602 is a detailed exploded perspective view illustrating the second antenna 210-2, and 603 is a sectional view taken along line E-E'. The first antenna 210-1 may have the same structure as the second antenna 210-2.

According to an embodiment, the second antenna 210-2 may include an antenna chip 210-2a and a feeding part 210-2b. For example, the antenna chip 210-2a may include an antenna pattern 611 and a dielectric 612. When the antenna chip 210-2a is mounted on the antenna substrate 202, a portion 631 of the antenna pattern 611 may be connected to the feeding part 210-2b. The feeding part 210-2b may be operatively connected with communication circuitry (not illustrated) that is mounted on the antenna substrate 202.

According to an embodiment, the antenna chip 210-2a may be coupled to the antenna substrate 202 by dummy patterns. For example, a first dummy pattern 621 may be formed on the antenna substrate 202. A second dummy pattern (not illustrated) may be formed on one surface of the antenna chip 210-2a to correspond to the first dummy pattern 621. The antenna chip 210-2a may be coupled to the antenna substrate 202 through a coupling of the first dummy pattern 621 and the second dummy pattern. According to an embodiment, the first dummy pattern 621 may be electrically floated by being separated from a ground area of the antenna substrate 202.

Figure 7A:
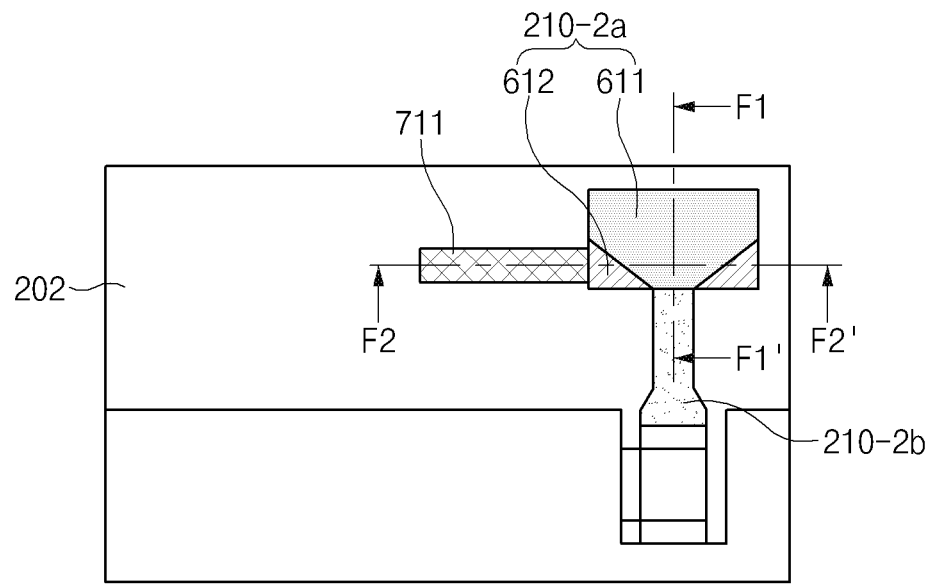
FIG. 7A is a view illustrating one example of a second antenna having a structure asymmetric to a first antenna in an electronic device according to an embodiment.
Figure 7A:
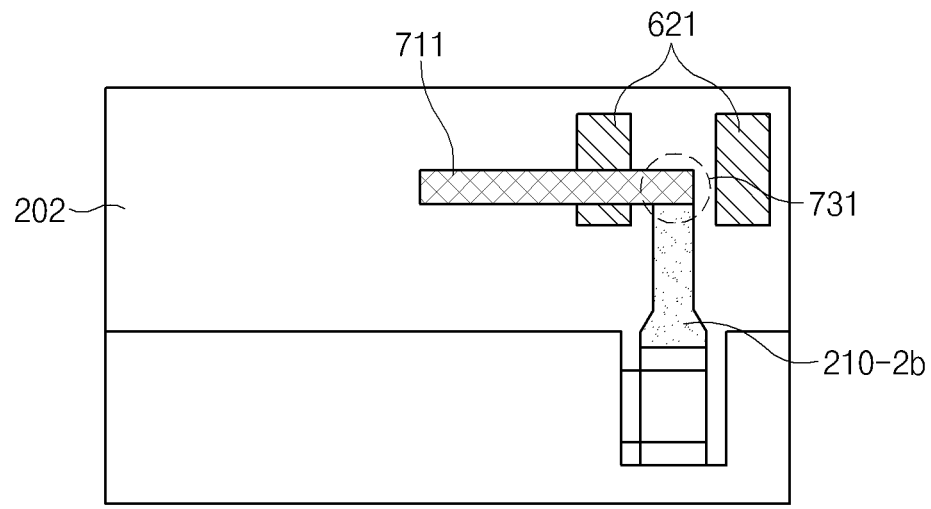
Figure 7B:
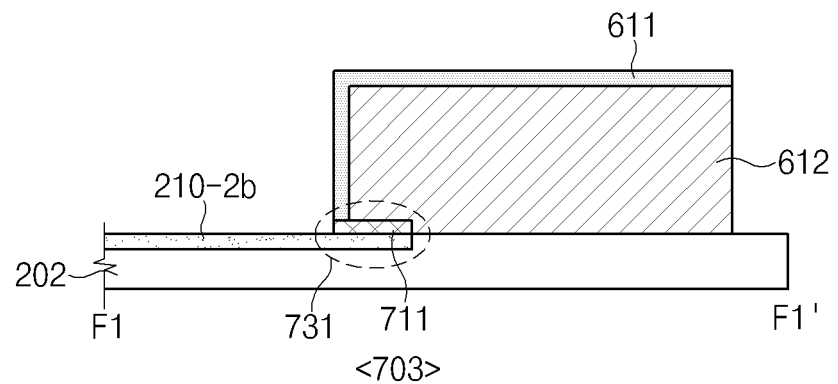
FIG. 7B illustrates sectional views taken along lines F1-F1' and F2-F2' of FIG. 7A.
Figure 7B:
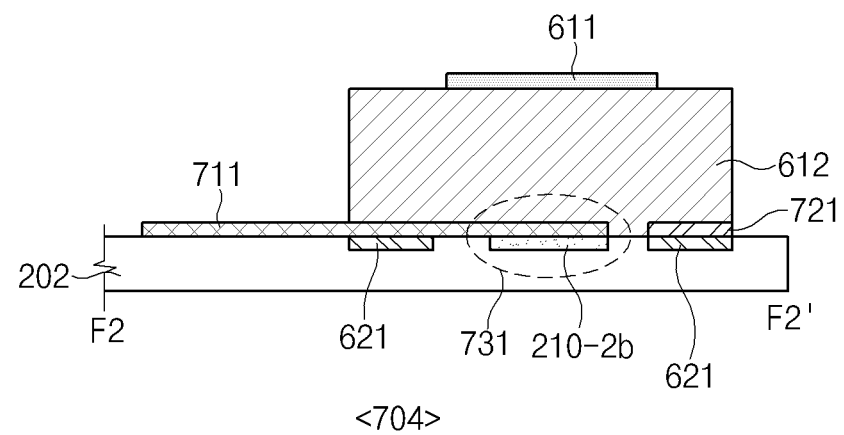

FIG. 7A is a view illustrating one example of a second antenna having a structure asymmetric to a first antenna in an electronic device according to an embodiment. FIG. 7B illustrates sectional views taken along lines F1-F1' and F2-F2' of FIG. 7A.

Referring to FIGS. 7A and 7B, 701 is a plan view illustrating the second antenna (e.g., the second antenna 210-2 of FIG. 4). 702 is a plan view illustrating the second antenna from which an antenna chip 210-2a in 701 is omitted. 703 is a sectional view taken along line F1-F1' of 701. 704 is a sectional view taken along line F2-F2' of 701.

According to an embodiment, the second antenna may be formed to have a structure asymmetric to the first antenna (e.g., the first antenna 210-1 of FIG. 6A). For example, unlike the second antenna 210-2 of FIG. 6A, the second antenna may include an additional antenna pattern 711. A portion 731 of the additional antenna pattern 711 may be connected with the feeding part 210-2b and the antenna pattern 611. Accordingly, the length (or, the area or the volume) of the antenna pattern 611 may be further expanded as compared to the second antenna 210-2 of FIG. 6A. The second antenna may exhibit a different radiation pattern from the first antenna and may receive signals transmitted from an external electronic device (e.g., the external electronic device 105), without being affected by a door frame (e.g., the door frame 5a) and an electric-wave blocking member (e.g., the electric-wave blocking member 203). In various embodiments, the size of the additional antenna pattern 711 may be determined in consideration of influences of the door frame and the electric-wave blocking member.

According to an embodiment, the additional antenna pattern 711 may extend from the antenna pattern 611 in a direction toward the first antenna. For example, the additional antenna pattern 711 may be disposed to cross at least one of first dummy patterns 621. In an embodiment, the additional antenna pattern 711 may be connected with the at least one of the first dummy patterns 621 and may enlarge the effective area of the antenna pattern 611 together with the at least one of the first dummy patterns 621. In another embodiment, an insulator (not illustrated) may be disposed between the additional antenna pattern 711 and the at least one of the first dummy patterns 621.

According to an embodiment, the antenna chip 210-2a may include the first dummy patterns 621, and an antenna substrate 202 may include a second dummy pattern 721. For example, the first dummy patterns 621 may be coupled with the second dummy pattern 721, and the antenna chip 210-2a may be coupled to the antenna substrate 202.

Figure 8A:
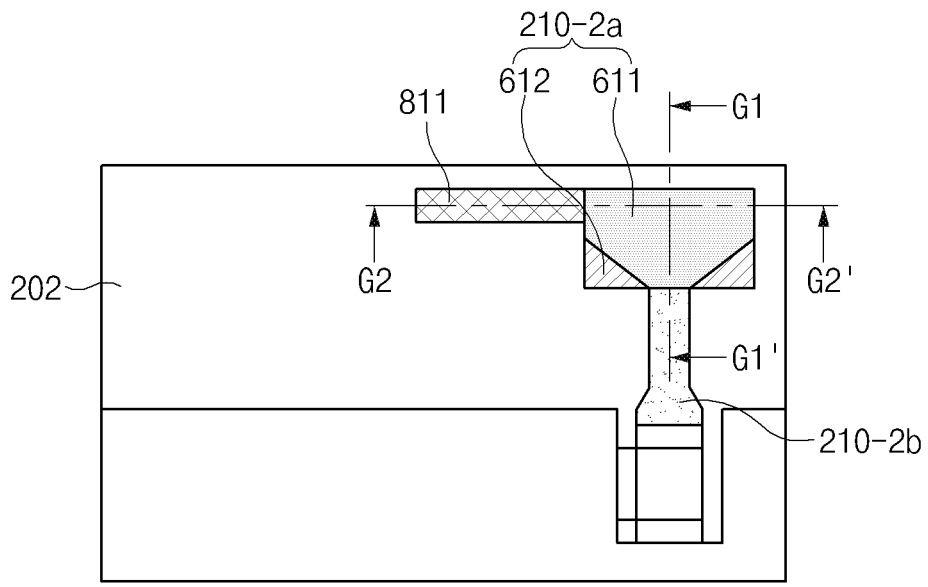
FIG. 8A is a view illustrating another example of a second antenna having a structure asymmetric to a first antenna in an electronic device according to an embodiment.
Figure 8A:
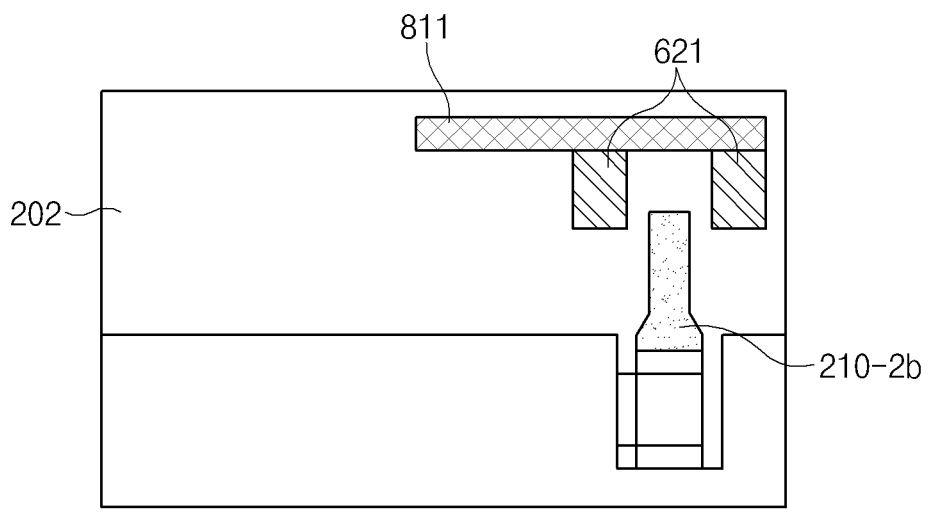
Figure 8B:
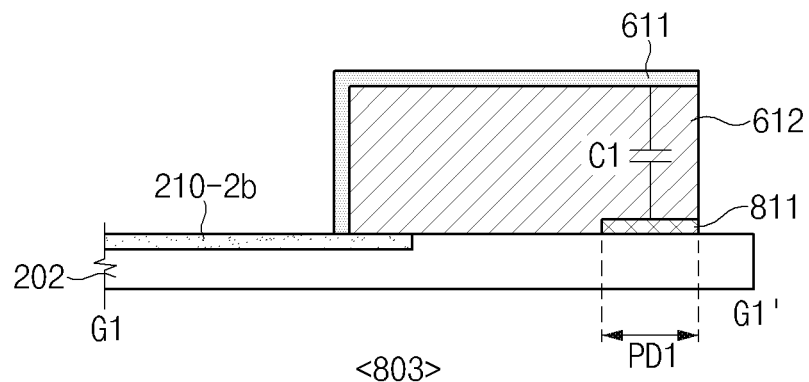
FIG. 8B illustrates sectional views taken along lines G1-G1' and G2-G2' of FIG. 8A.
Figure 8B:
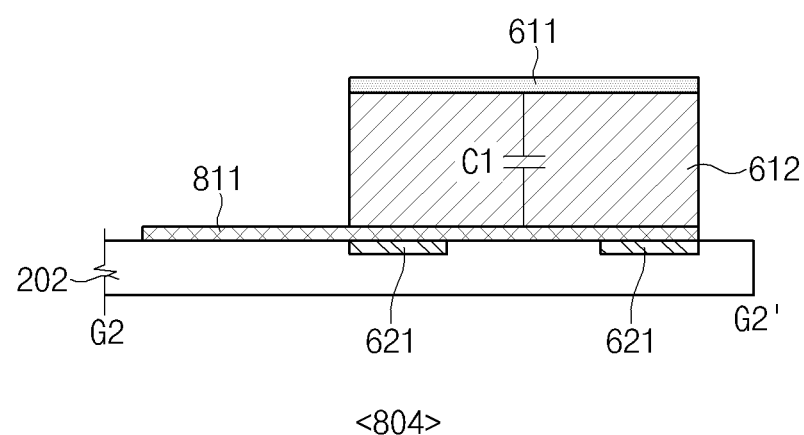

FIG. 8A is a view illustrating another example of a second antenna having a structure asymmetric to a first antenna in an electronic device according to an embodiment. FIG. 8B illustrates sectional views taken along lines G1-G1' and G2-G2' of FIG. 8A.

Referring to FIGS. 8A and 8B, 801 is a plan view illustrating the second antenna (e.g., the second antenna 210-2 of FIG. 4). 802 is a plan view illustrating the second antenna from which an antenna chip 210-2a in 801 is omitted. 803 is a sectional view taken along line G1-G1' of 801. 804 is a sectional view taken along line G2-G2' of 801.

According to an embodiment, the second antenna may be formed to have a structure asymmetric to the first antenna (e.g., the first antenna 210-1 of FIG. 6A). For example, unlike the second antenna 210-2 of FIG. 6A, the second antenna may include an additional antenna pattern 811. The additional antenna pattern 811 may be disposed on an antenna substrate 202 so as to be spaced apart from a feeding part 210-2b by a specific distance. The additional antenna pattern 811 may be disposed between the antenna chip 210-2a and the antenna substrate 202. The additional antenna pattern 811 may form a coupling C1 with an antenna pattern 611. Accordingly, the length (or, the area or the volume) of the antenna pattern 611 may be further expanded as compared to the second antenna 210-2 of FIG. 6A. The second antenna may exhibit a different radiation pattern from the first antenna and may receive a signal transmitted from an external electronic device (e.g., the external electronic device 105), without being affected by a door frame (e.g., the door frame 5a) and an electric-wave blocking member (e.g., the electric-wave blocking member 203). In various embodiments, the size of the additional antenna pattern 811 may be determined in consideration of influences of the door frame and the electric-wave blocking member.

According to an embodiment, the additional antenna pattern 811 may extend from the antenna pattern 611 in a direction toward the first antenna. For example, the additional antenna pattern 811 may be disposed to cross at least one of first dummy patterns 621. In an embodiment, the additional antenna pattern 811 may be connected with at least one of the first dummy patterns 621 and may enlarge the effective area of the antenna pattern 611 together with the at least one of the first dummy patterns 621. In another embodiment, an insulator (not illustrated) may be disposed between the additional antenna pattern 811 and the at least one of the first dummy patterns 621. In various embodiments, the width of the additional antenna pattern 811 may have a first width PD1.

Figure 9A:
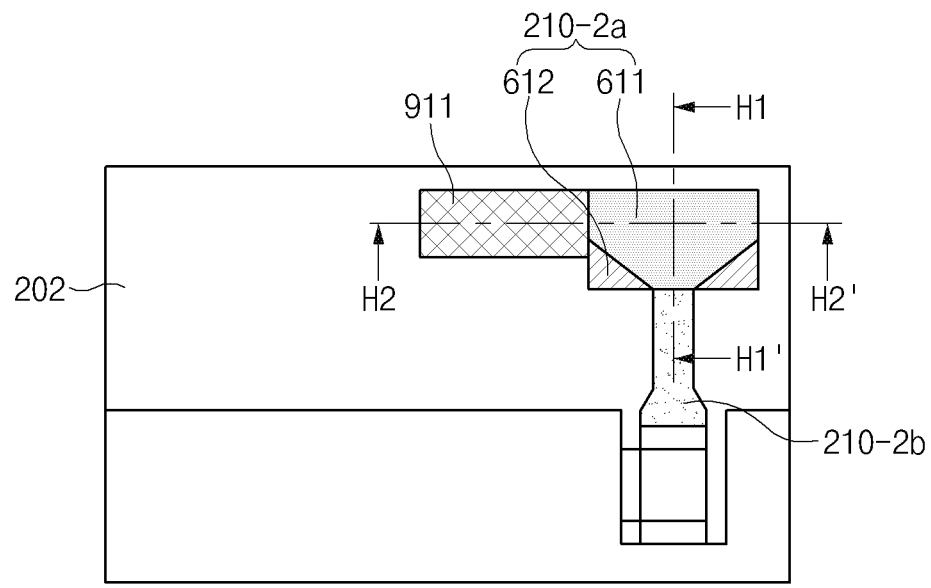
FIG. 9A is a view illustrating another example of a second antenna having a structure asymmetric to a first antenna in an electronic device according to an embodiment.
Figure 9A:
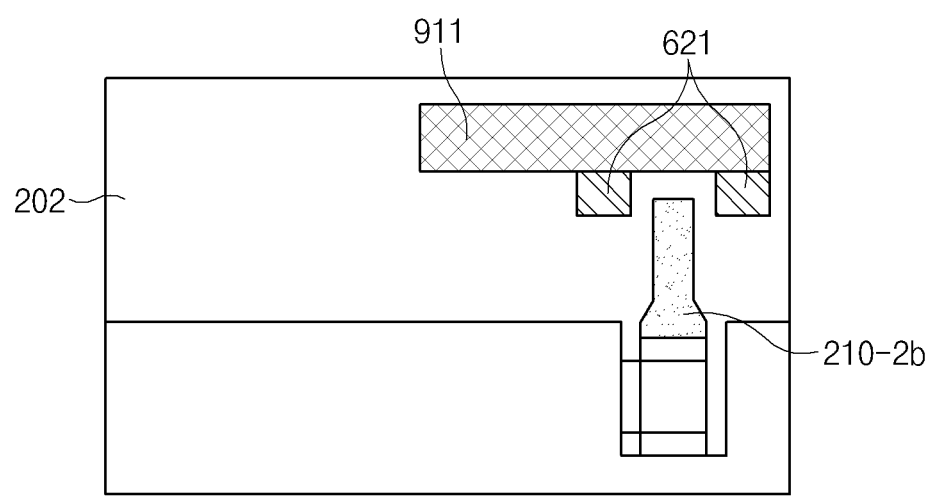
Figure 9B:
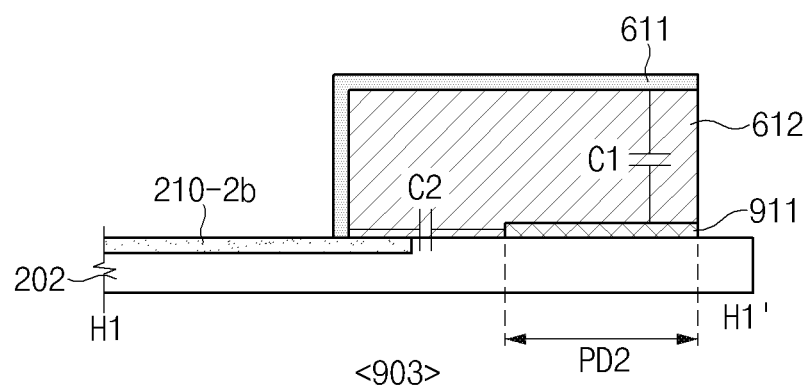
FIG. 9B illustrates sectional views taken along lines H1-H1' and H2-H2' of FIG. 9A.
Figure 9B:
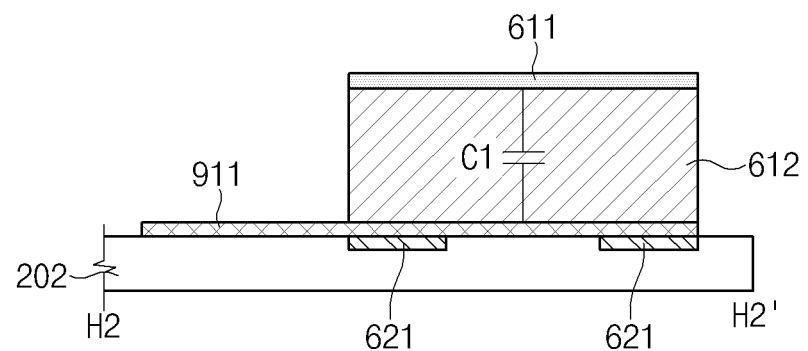

FIG. 9A is a view illustrating another example of a second antenna having a structure asymmetric to a first antenna in an electronic device according to an embodiment. FIG. 9B illustrates sectional views taken along lines H1-H1' and H2-H2' of FIG. 9A.

Referring to FIGS. 9A and 9B, 901 is a plan view illustrating the second antenna (e.g., the second antenna 210-2 of FIG. 4). 902 is a plan view illustrating the second antenna from which an antenna chip 210-2a in 901 is omitted. 903 is a sectional view taken along line H1-H1' of 901. 904 is a sectional view taken along line H2-H2' of 901.

According to an embodiment, the second antenna may be formed to have a structure asymmetric to the first antenna (e.g., the first antenna 210-1 of FIG. 6A). For example, unlike the second antenna 210-2 of FIG. 6A, the second antenna may include an additional antenna pattern 911. The additional antenna pattern 911 may be disposed on an antenna substrate 202 so as to be spaced apart from a feeding part 210-2b by a specific distance. The additional antenna pattern 911 may be disposed between the antenna chip 210-2a and the antenna substrate 202. The additional antenna pattern 911 may form a first coupling C1 with a portion of an antenna pattern 611. Furthermore, the additional antenna pattern 911 may form a second coupling C2 with another portion of the antenna pattern 611. Accordingly, the length (or, the area or the volume) of the antenna pattern 611 may be further expanded as compared to the second antenna 210-2 of FIG. 6A. The second antenna may exhibit a different radiation pattern from the first antenna and may receive signals transmitted from an external electronic device (e.g., the external electronic device 105), without being affected by a door frame (e.g., the door frame 5a) and an electric-wave blocking member (e.g., the electric-wave blocking member 203). In various embodiments, the size of the additional antenna pattern 911 may be determined in consideration of influences of the door frame and the electric-wave blocking member.

According to an embodiment, the additional antenna pattern 911 may extend from the antenna pattern 611 in a direction toward the first antenna. For example, the additional antenna pattern 911 may be disposed to cross at least one of first dummy patterns 621. In an embodiment, the additional antenna pattern 911 may be connected with the at least one of the first dummy patterns 621 and may enlarge the effective area of the antenna pattern 611 together with the at least one of the first dummy patterns 621. In another embodiment, an insulator (not illustrated) may be disposed between the additional antenna pattern 911 and the at least one of the first dummy patterns 621. In an embodiment, the width of the additional antenna pattern 911 may be a second width PD2 greater than the first width PD1 of FIG. 8B. Accordingly, the additional antenna pattern 911, together with the antenna pattern 611, may form couplings (e.g., the first coupling C1 and the second coupling C2) at a plurality of locations.

Figure 10A:
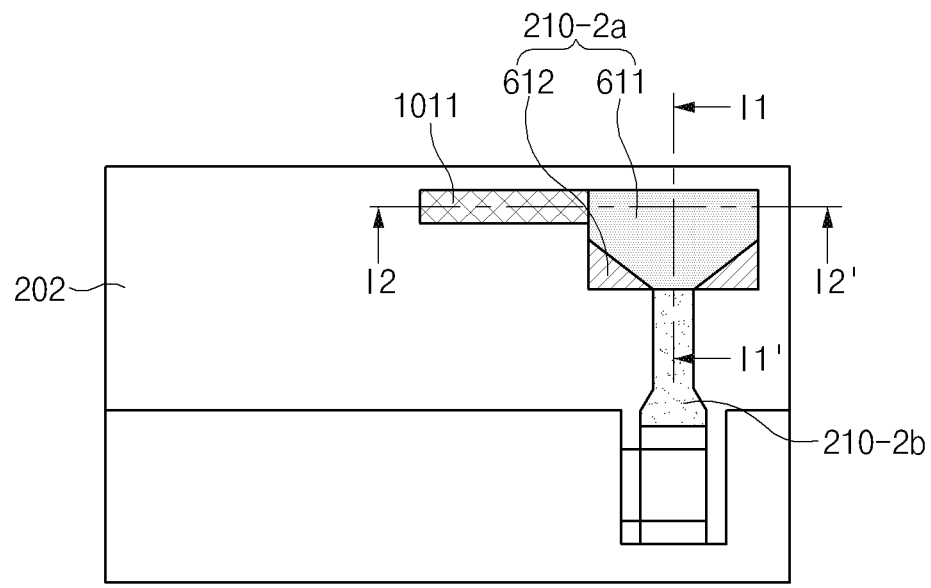
FIG. 10A is a view illustrating another example of a second antenna having a structure asymmetric to a first antenna in an electronic device according to an embodiment.
Figure 10A:
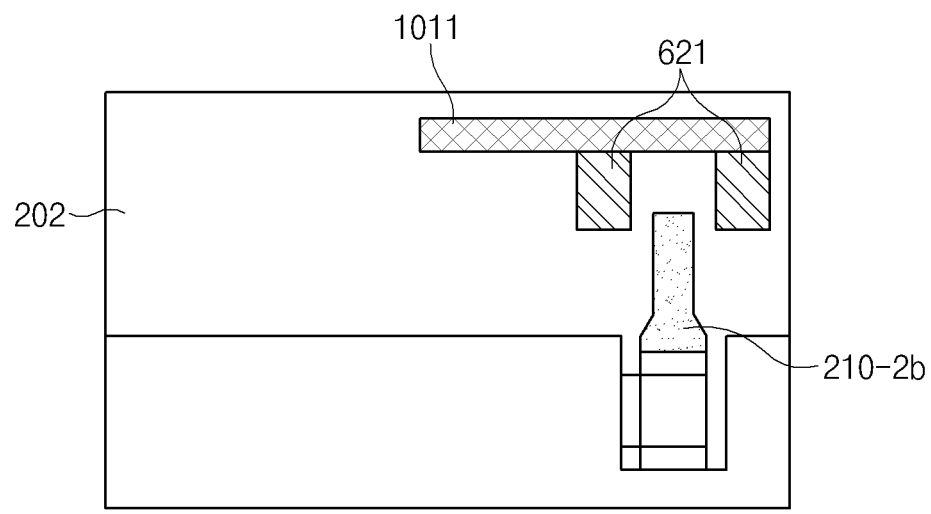
Figure 10B:
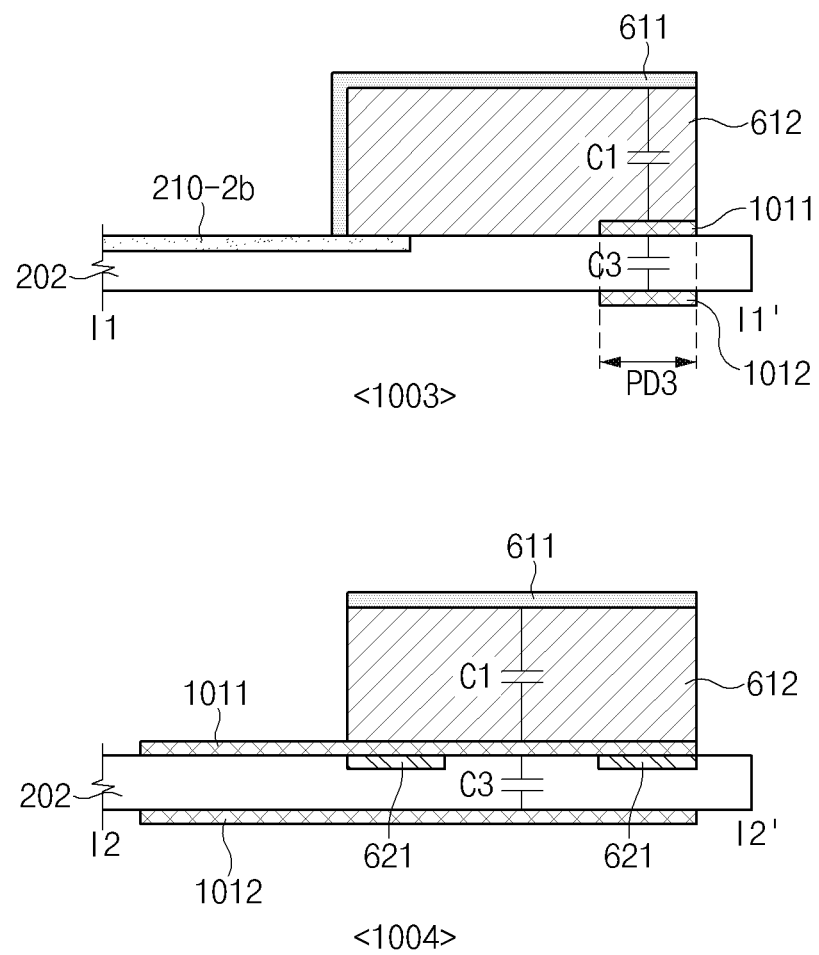
FIG. 10B illustrates sectional views taken along lines and I1-I1' and I2-I2' of FIG. 10A.

FIG. 10A is a view illustrating another example of a second antenna having a structure asymmetric to a first antenna in an electronic device according to an embodiment. FIG. 10B illustrates sectional views taken along lines I1-I1' and I2-I2' of FIG. 10A.

Referring to FIGS. 10A and 10B, 1001 is a plan view illustrating the second antenna (e.g., the second antenna 210-2 of FIG. 4). 1002 is a plan view illustrating the second antenna from which an antenna chip 210-2a in 1001 is omitted. 1003 is a sectional view taken along line I1-I1' of 1001. 1004 is a sectional view taken along line I2-I2' of 1001.

According to an embodiment, the second antenna may be formed to have a structure asymmetric to the first antenna (e.g., the first antenna 210-1 of FIG. 6A). For example, unlike the second antenna 210-2 of FIG. 6A, the second antenna may include a plurality of additional antenna patterns 1011 and 1012. The first additional antenna pattern 1011 may be disposed on one surface of an antenna substrate 202 so as to be spaced apart from a feeding part 210-2b by a specific distance. The first additional antenna pattern 1011 may be disposed between the antenna chip 210-2a and the antenna substrate 202. The first additional antenna pattern 1011 may form a first coupling C1 with a portion of an antenna pattern 611. In an embodiment, the second additional antenna pattern 1012 may be disposed on the opposite surface of the antenna substrate 202 where the first additional antenna pattern 1011 is disposed. At least a portion of the second additional antenna pattern 1012 may be disposed to vertically overlap the first additional antenna pattern 1011. That is, the location of the second additional antenna pattern 1012 may correspond with the location of the first additional antenna pattern 1011. The second additional antenna pattern 1012 may be disposed to be spaced apart from the feeding part 210-2b by a specific distance. The second additional antenna pattern 1012 may form a third coupling C3 with a portion of the first additional antenna pattern 1011. Accordingly, the length (or, the area or the volume) of the antenna pattern 611 may be further expanded as compared to the second antenna 210-2 of FIG. 6A. The second antenna may exhibit a different radiation pattern from the first antenna and may receive signals transmitted from an external electronic device (e.g., the external electronic device 105), without being affected by a door frame (e.g., the door frame 5a) and an electric-wave blocking member (e.g., the electric-wave blocking member 203). In various embodiments, the sizes of the first additional antenna pattern 1011 and the second additional antenna pattern 1012 may be determined in consideration of influences of the door frame and the electric-wave blocking member.

According to an embodiment, the first additional antenna pattern 1011 or the second additional antenna pattern 1012 may extend from the antenna pattern 611 in a direction toward the first antenna. For example, the first additional antenna pattern 1011 may be disposed to cross at least one of first dummy patterns 621. In an embodiment, the first additional antenna pattern 1011 may be connected with the at least one of the first dummy patterns 621 and may enlarge the effective area of the antenna pattern 611 together with the at least one of the first dummy patterns 621. In another embodiment, an insulator (not illustrated) may be disposed between the first additional antenna pattern 1011 and the at least one of the first dummy patterns 621. In an embodiment, the width of the first additional antenna pattern 1011 or the second additional antenna pattern 1012 may be a third width PD3. The third width PD3 may be the same as, or similar to, the first width PD1 of FIG. 8b. The third width PD3 may be smaller than the second width PD2 of FIG. 9b.

Figure 11A:
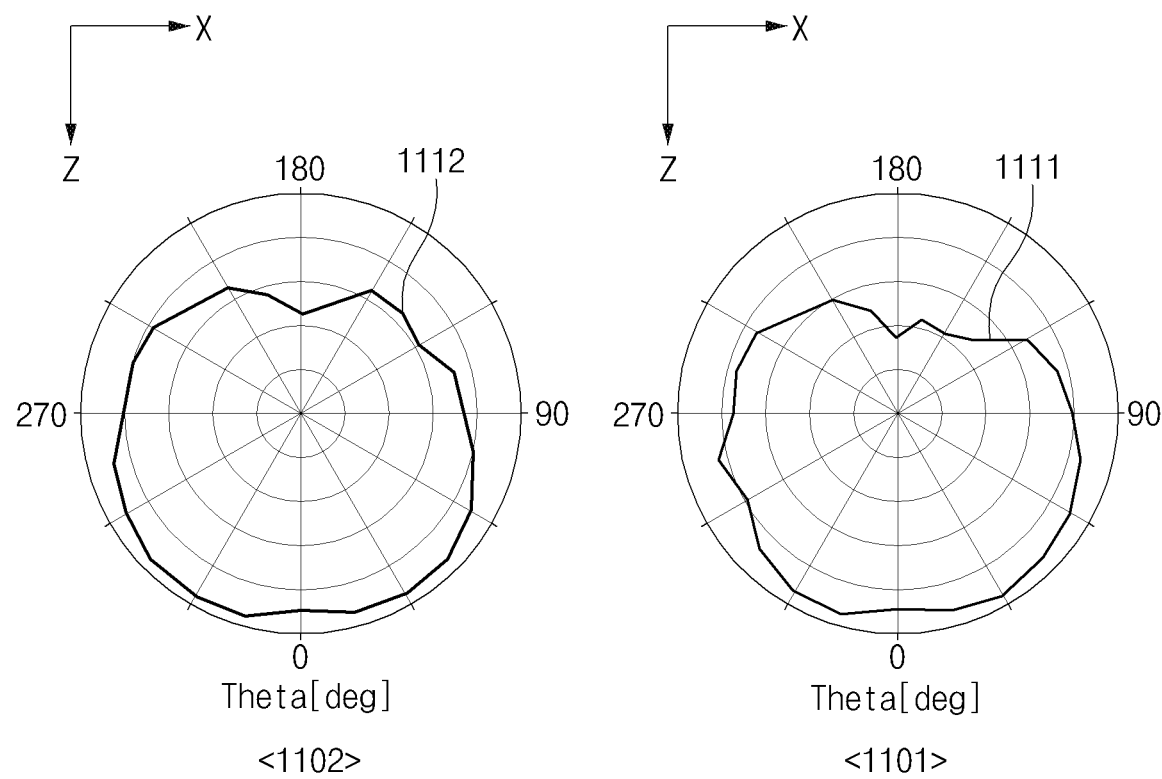
FIG. 11A is a graph illustrating radiation patterns of a plurality of antennas of an electronic device according to an embodiment.

FIG. 11A is a graph illustrating radiation patterns of a plurality of antennas of an electronic device according to an embodiment. FIG. 11A illustrates a graph 1101 for a radiation pattern 1111 of a first antenna and a graph 1102 for a radiation pattern 1112 of a second antenna. FIG. 11A relates to a scenario where the electronic device 101 does not include an electric-wave blocking member (e.g., the electric-wave blocking member 203), uses the first antenna (e.g., the first antenna 210-1 of FIG. 6A) and the second antenna (e.g., the second antenna 210-2 of FIG. 6A) that are symmetrical, and where the door frame (e.g., the door frame 5a) is made of a material (e.g., wood, stone, or plastic) that does not reflect electric waves well.

Referring to FIG. 11A, because the door frame does not reflect electric waves and no electric-wave blocking member is present, the radiation pattern 1111 of the first antenna and the radiation pattern 1112 of the second antenna may be similarly in all directions. However, in the case where the door frame (e.g., the door frame 5a) is made of a material (e.g., metal) that reflects electric waves well, the electronic device having such a structure as illustrated in FIG. 11A may malfunction due to diffused reflection of signals by the door frame.

Figure 11B:
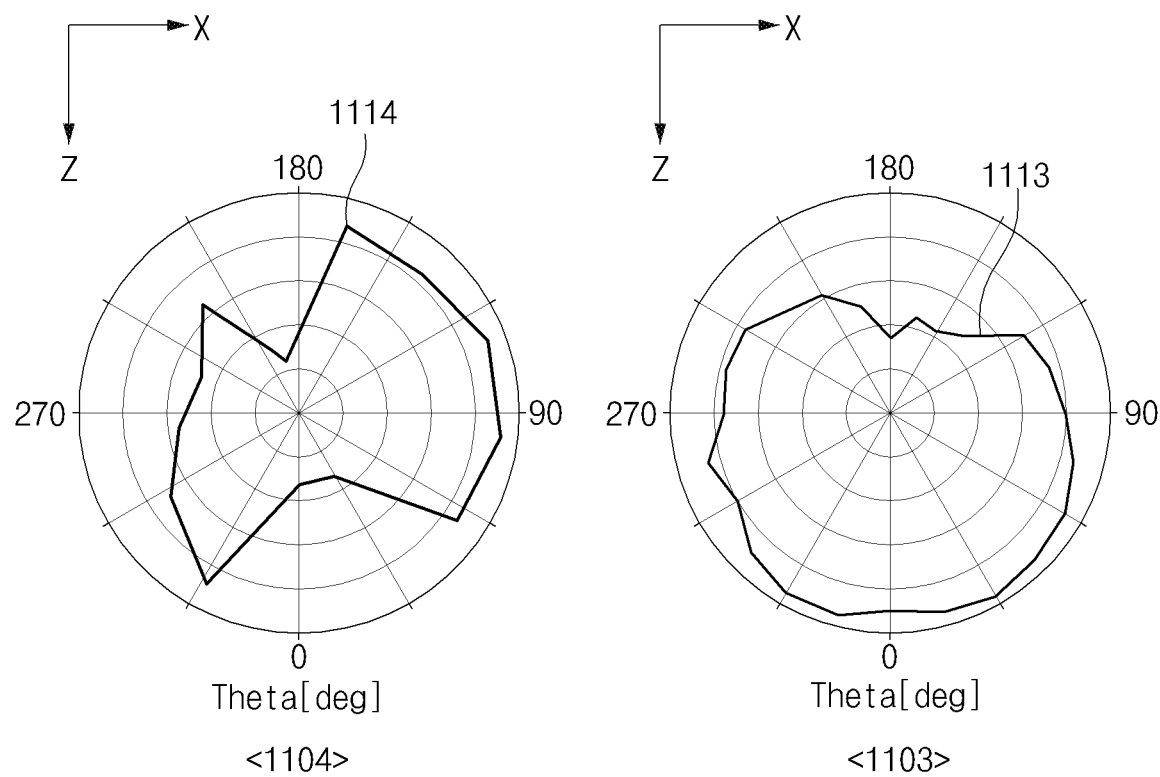
FIG. 11B is a graph illustrating radiation patterns of a plurality of antennas of an electronic device according to an embodiment.

FIG. 11B is a graph illustrating radiation patterns of a plurality of antennas of an electronic device according to an embodiment. FIG. 11B illustrates a graph 1103 for a radiation pattern 1113 of a first antenna and a graph 1104 for a radiation pattern 1114 of a second antenna. FIG. 11B relates to a scenario where the electronic device 101 does not include an electric-wave blocking member (e.g., the electric-wave blocking member 203), uses the first antenna (e.g., the first antenna 210-1 of FIG. 6A) and the second antenna (e.g., the second antenna 210-2 of FIG. 6A) that are symmetrical, and where the door frame (e.g., the door frame 5a) is made of a material (e.g., metal) that reflects electric waves well.

Referring to FIG. 11B, because the door frame reflects electric waves, the radiation pattern 1114 of the second antenna may be smaller in size than the radiation pattern 1112 of the second antenna of FIG. 11a for almost all directions. Accordingly, errors (e.g., ER1 or ER2) as illustrated in FIG. 3B may occur in the electronic device.

Figure 11C:
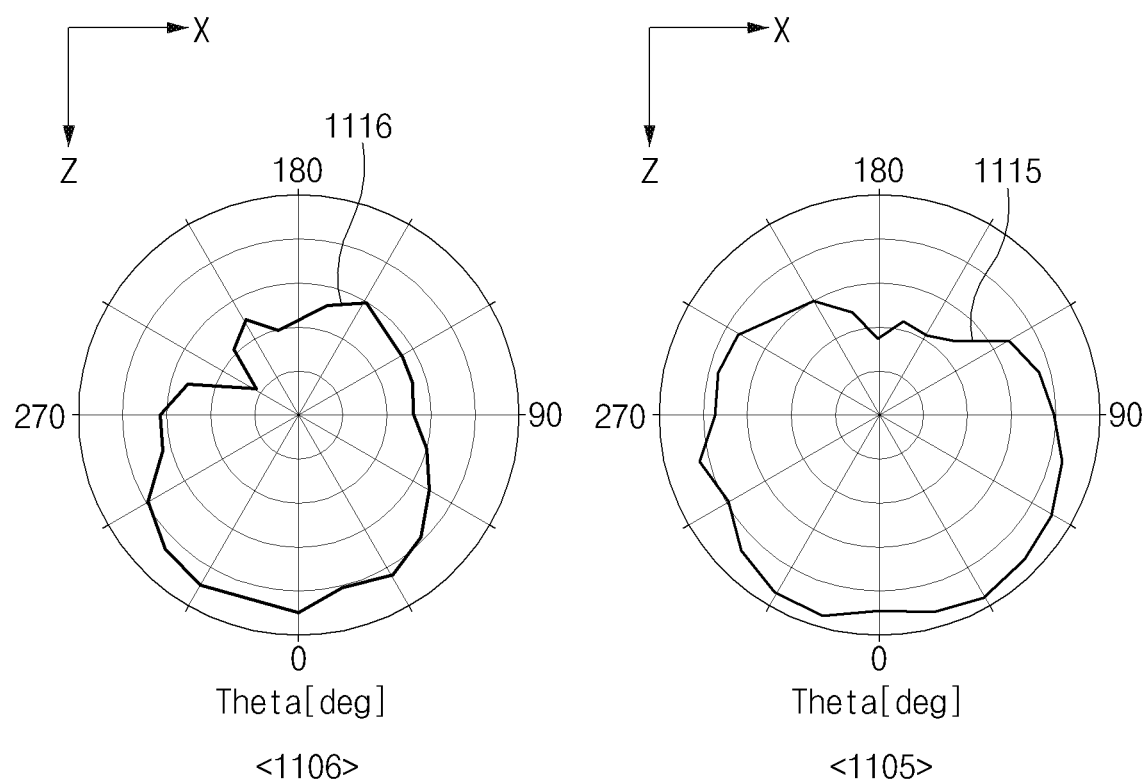
FIG. 11C is a graph illustrating radiation patterns of a plurality of antennas of an electronic device when an electric-wave blocking member is used according to an embodiment.

FIG. 11C is a graph illustrating radiation patterns of a plurality of antennas of an electronic device when an electric-wave blocking member is used according to an embodiment. FIG. 11C illustrates a graph 1105 for a radiation pattern 1115 of a first antenna and a graph 1106 for a radiation pattern 1116 of a second antenna. FIG. 11C relates to a scenario where the electronic device 101 includes an electric-wave blocking member (e.g., the electric-wave blocking member 203) having a size the same as or similar to that of a back plate (e.g., the back plate 360) as in the embodiment of FIG. 5A. The electronic device of FIG. 11C also uses the first antenna (e.g., the first antenna 210-1) and the second antenna (e.g., the second antenna 210-2) that are symmetrical.

Referring to FIG. 11C, between 180 degrees and 270 degrees, the radiation pattern 1116 of the second antenna may be smaller in size than the radiation pattern 1112 of the second antenna of FIG. 11A due to the electric-wave blocking member. In FIG. 11C, the signals reflected by the door frame (e.g., the door frame 5a) may be blocked by the electric-wave blocking member, and the performance of the electronic device may be maintained irrespective of the material of the door frame.

Figure 11D:
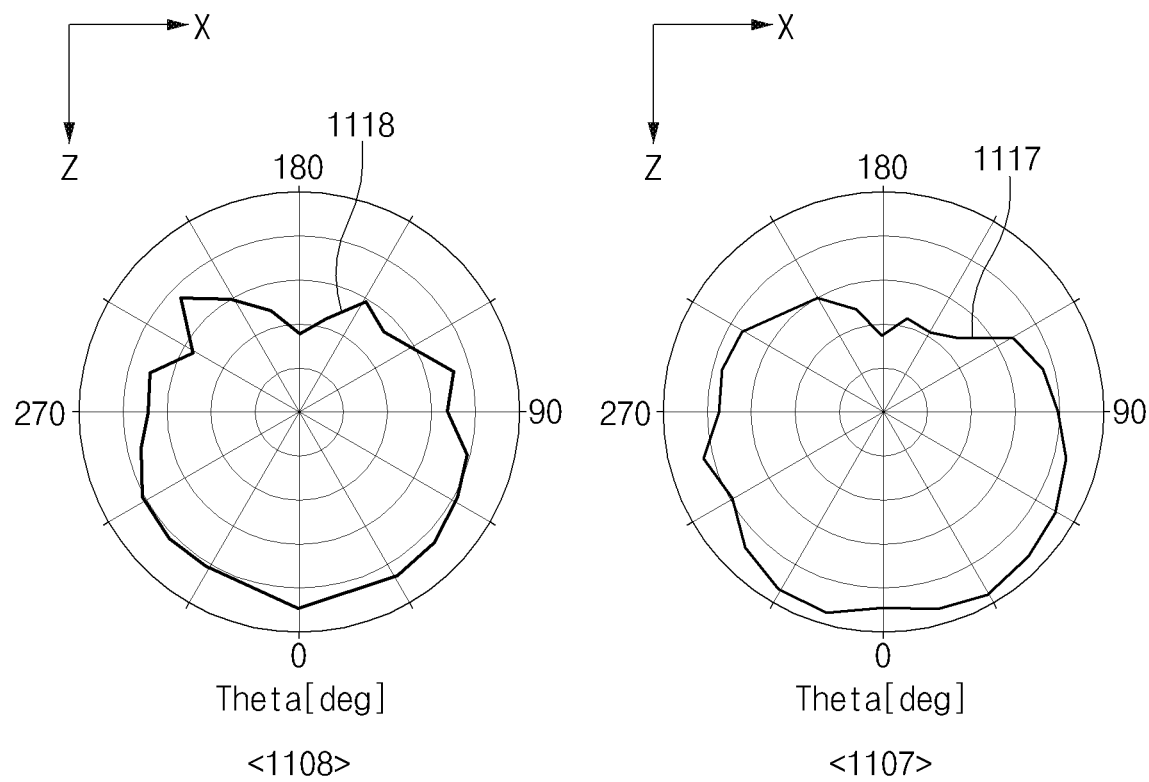
FIG. 11D is a graph illustrating radiation patterns of a plurality of antennas of an electronic device when an electric-wave blocking member and asymmetrical antennas are used according to an embodiment.

FIG. 11D is a graph illustrating radiation patterns of a plurality of antennas of an electronic device when an electric-wave blocking member and asymmetrical antennas are used according to an embodiment. FIG. 11D illustrates a graph 1107 for a radiation pattern 1117 of a first antenna and a graph 1108 for a radiation pattern 1118 of a second antenna. FIG. 11C relates to a scenario where the electronic device 101 includes an electric-wave blocking member (e.g., the electric-wave blocking member 203) having a smaller size than a back plate (e.g., the back plate 360) as in the embodiment of FIG. 5B. The electronic device of FIG. 11D also uses the first antenna (e.g., the first antenna 210-1) and the second antenna (e.g., the second antenna 210-2) that have asymmetrical structures as in FIG. 7A.

Referring to FIG. 11D, between 180 degrees and 270 degrees, the radiation pattern 1118 of the second antenna may be smaller in size than the radiation pattern 1112 of the second antenna of FIG. 11A. The size of the electric-wave blocking member used in FIG. 11D is smaller than the size of the electric-wave blocking member used in FIG. 11C, and therefore between 180 degrees and 270 degrees, the radiation pattern 1118 of the second antenna may be larger in size than the radiation pattern 1116 of the second antenna of FIG. 11C. Because the sizes of the radiation patterns are larger in FIG. 11D than in FIG. 11C, signals reflected by the door frame (e.g., the door frame 5a) may affect the second antenna. The influence of the signal reflected by the door frame (e.g., the door frame 5a) may be controlled by the second antenna having a structure asymmetric to the first antenna, and the performance of the electronic device may be maintained irrespective of the material of the door frame.

Figure 12:
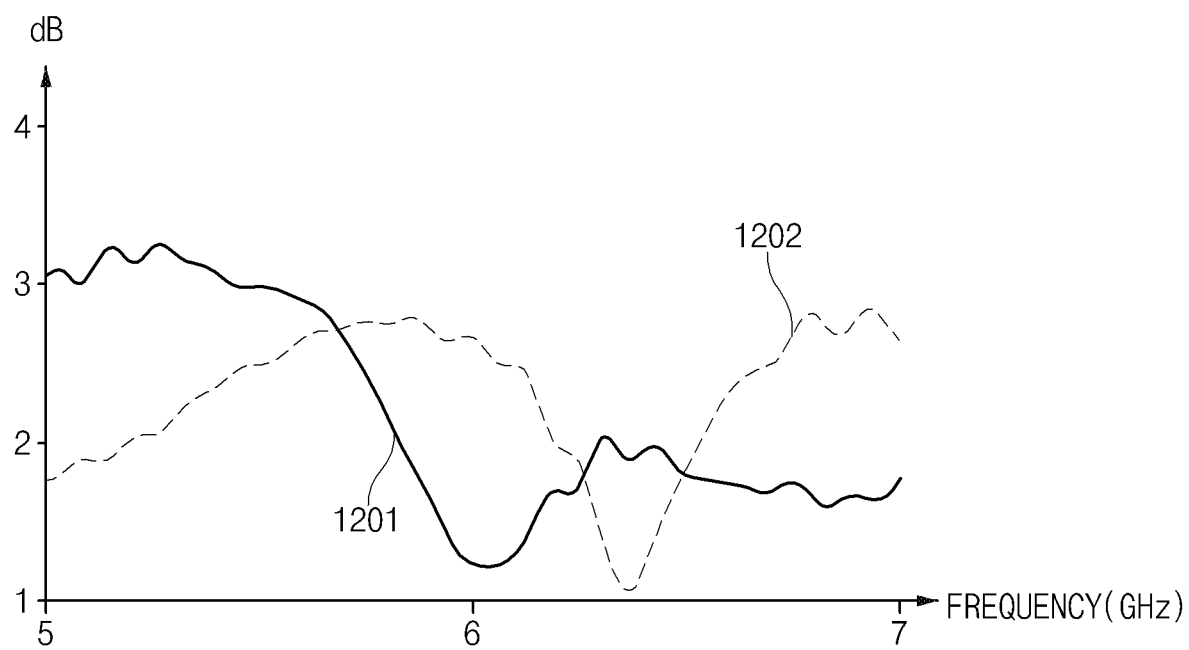
FIG. 12 is a graph illustrating frequency characteristics of a second antenna according to an embodiment.

FIG. 12 is a graph illustrating frequency characteristics of a second antenna according to an embodiment. Referring to FIG. 12, a first graph 1201 represents the voltage standing wave ratio (VSWR) of the second antenna (e.g., the second antenna 210-2) when an electric-wave blocking member (e.g., the electric-wave blocking member 203) is not used. A second graph 1202 represents the VSWR of the second antenna when an electric-wave blocking member is used, embodiments of which are shown in FIGS. 5A to 5D.

According to an embodiment, when the electric-wave blocking member is used (e.g., the second graph 1202), the center frequency of the second antenna may be higher than when no electric-wave blocking member is used (e.g., the first graph 1201). In the electronic device 101, the first antenna (e.g., the first antenna 210-1) and the second antenna should use the same frequency (e.g., the first graph 1201), and therefore when the center frequency of the second antenna is changed, the transmitting/receiving performance of the second antenna may decrease. Accordingly, to use the same frequency as that of the first antenna, the center frequency of the second antenna may be adjusted by using an additional antenna pattern (e.g., 711, 811, 911, 1011, or 1012) as illustrated in FIGS. 7A to 10B.

Figure 13:
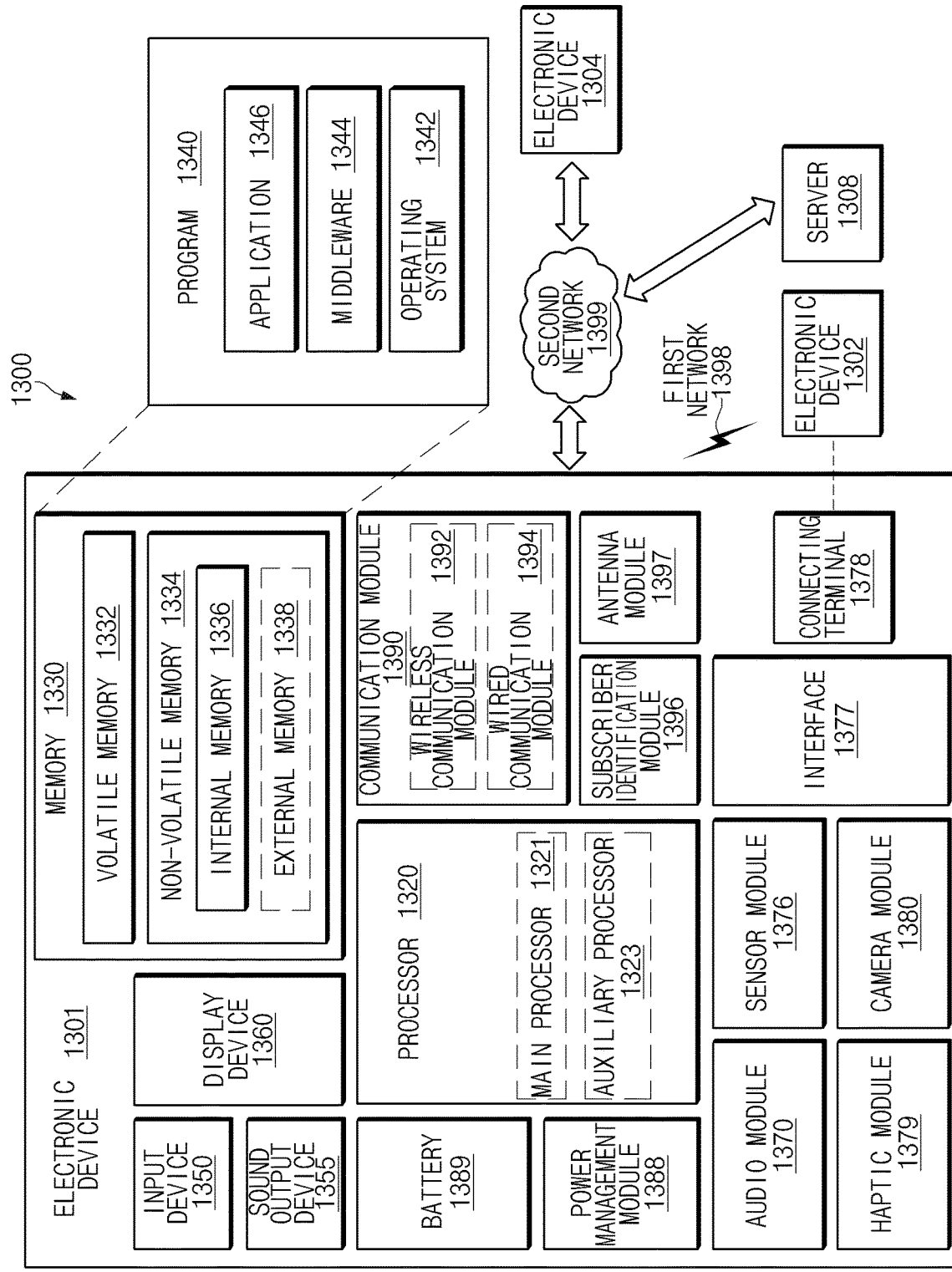
FIG. 13 is a block diagram illustrating an electronic device in a network environment according to various embodiments.

FIG. 13 is a block diagram illustrating an electronic device 1301 in a network environment 1300 according to various embodiments. Referring to FIG. 13, the electronic device 1301 in the network environment 1300 may communicate with an electronic device 1302 via a first network 1398 (e.g., a short-range wireless communication network), or an electronic device 1304 or a server 1308 via a second network 1399 (e.g., a long-range wireless communication network). According to an embodiment, the electronic device 1301 may communicate with the electronic device 1304 via the server 1308. According to an embodiment, the electronic device 1301 may include a processor 1320, memory 1330, an input device 1350, a sound output device 1355, a display device 1360, an audio module 1370, a sensor module 1376, an interface 1377, a haptic module 1379, a camera module 1380, a power management module 1388, a battery 1389, a communication module 1390, a subscriber identification module (SIM) 1396, or an antenna module 1397. In some embodiments, at least one (e.g., the display device 1360 or the camera module 1380) of the components may be omitted from the electronic device 1301, or one or more other components may be added in the electronic device 1301. In some embodiments, some of the components may be implemented as single integrated circuitry. For example, the sensor module 1376 (e.g., a fingerprint sensor, an iris sensor, or an illuminance sensor) may be implemented as embedded in the display device 1360 (e.g., a display).

The processor 1320 may execute, for example, software (e.g., a program 1340) to control at least one other component (e.g., a hardware or software component) of the electronic device 1301 coupled with the processor 1320, and may perform various data processing or computation. According to one embodiment, as at least part of the data processing or computation, the processor 1320 may load a command or data received from another component (e.g., the sensor module 1376 or the communication module 1390) in volatile memory 1332, process the command or the data stored in the volatile memory 1332, and store resulting data in non-volatile memory 1334. According to an embodiment, the processor 1320 may include a main processor 1321 (e.g., a central processing unit (CPU) or an application processor (AP)), and an auxiliary processor 1323 (e.g., a graphics processing unit (GPU), an image signal processor (ISP), a sensor hub processor, or a communication processor (CP)) that is operable independently from, or in conjunction with, the main processor 1321. Additionally or alternatively, the auxiliary processor 1323 may be adapted to consume less power than the main processor 1321, or to be specific to a specified function. The auxiliary processor 1323 may be implemented as separate from, or as part of the main processor 1321.

The auxiliary processor 1323 may control at least some of functions or states related to at least one component (e.g., the display device 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). According to an embodiment, the auxiliary processor 1323 (e.g., an image signal processor or a communication processor) may be implemented as part of another component (e.g., the camera module 1380 or the communication module 1390) functionally related to the auxiliary processor 1323.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input device 1350 may receive a command or data to be used by other component (e.g., the processor 1320) of the electronic device 1301, from the outside (e.g., a user) of the electronic device 1301. The input device 1350 may include, for example, a microphone, a mouse, a keyboard, or a digital pen (e.g., a stylus pen).

The sound output device 1355 may output sound signals to the outside of the electronic device 1301. The sound output device 1355 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1360 may visually provide information to the outside (e.g., a user) of the electronic device 1301. The display device 1360 may include, for example, a display, a hologram device, or a projector and control circuitry to control a corresponding one of the display, hologram device, and projector. According to an embodiment, the display device 1360 may include touch circuitry adapted to detect a touch, or sensor circuitry (e.g., a pressure sensor) adapted to measure the intensity of force incurred by the touch.

The audio module 1370 may convert a sound into an electrical signal and vice versa. According to an embodiment, the audio module 1370 may obtain the sound via the input device 1350, or output the sound via the sound output device 1355 or a headphone of an external electronic device (e.g., an electronic device 1302) directly (e.g., wiredly) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the electronic device 1302) directly (e.g., wiredly) or wirelessly. According to an embodiment, the interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device (e.g., the electronic device 1302). According to an embodiment, the connecting terminal 1378 may include, for example, a HDMI connector, a USB connector, a SD card connector, or an audio connector (e.g., a headphone connector).

The haptic module 1379 may convert an electrical signal into a mechanical stimulus (e.g., a vibration or a movement) or electrical stimulus which may be recognized by a user via his tactile sensation or kinesthetic sensation. According to an embodiment, the haptic module 1379 may include, for example, a motor, a piezoelectric element, or an electric stimulator.

The camera module 1380 may capture a still image or moving images. According to an embodiment, the camera module 1380 may include one or more lenses, image sensors, image signal processors, or flashes.

The power management module 1388 may manage power supplied to the electronic device 1301. According to one embodiment, the power management module 1388 may be implemented as at least part of, for example, a power management integrated circuit (PMIC).

The battery 1389 may supply power to at least one component of the electronic device 1301. According to an embodiment, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the application processor (AP)) and supports a direct (e.g., wired) communication or a wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™, wireless-fidelity (Wi-Fi) direct, or infrared data association (IrDA)) or the second network 1399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The antenna module 1397 may transmit or receive a signal or power to or from the outside (e.g., the external electronic device) of the electronic device 1301. According to an embodiment, the antenna module 1397 may include an antenna including a radiating element composed of a conductive material or a conductive pattern formed in or on a substrate (e.g., PCB). According to an embodiment, the antenna module 1397 may include a plurality of antennas. In such a case, at least one antenna appropriate for a communication scheme used in the communication network, such as the first network 1398 or the second network 1399, may be selected, for example, by the communication module 1390 (e.g., the wireless communication module 1392) from the plurality of antennas. The signal or the power may then be transmitted or received between the communication module 1390 and the external electronic device via the selected at least one antenna. According to an embodiment, another component (e.g., a radio frequency integrated circuit (RFIC)) other than the radiating element may be additionally formed as part of the antenna module 1397.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1301 and the external electronic device 1304 via the server 1308 coupled with the second network 1399. Each of the electronic devices 1302 and 1304 may be a device of a same type as, or a different type, from the electronic device 1301. According to an embodiment, all or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1340) including one or more instructions that are stored in a storage medium (e.g., internal memory 1336 or external memory 1338) that is readable by a machine (e.g., the electronic device 1301). For example, a processor (e.g., the processor 1320) of the machine (e.g., the electronic device 1301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory storage medium" means a tangible device, and does not include a signal (e.g., an electromagnetic wave), but this term does not differentiate between where data is semi-permanently stored in the storage medium and where the data is temporarily stored in the storage medium. For example, "the non-transitory storage medium" may include a buffer where data is temporally stored.

According to an embodiment, a method according to various embodiments of the disclosure may be included and provided in a computer program product. The computer program product may be traded as a product between a seller and a buyer. The computer program product (e.g., downloadable app)) may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to the embodiments of the disclosure, the electronic device may uniformly detect the location of a user irrespective of the on which the electronic device is disposed.

In addition, the disclosure may provide various aspects and advantages of the disclosed system that are directly or indirectly recognized.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device disposed on a door frame, the electronic device comprising:
   a back plate attached to the door frame, the back plate including a surface facing a first direction;
   a housing coupled to the surface of the back plate;
   a first antenna;
   a second antenna located between the first antenna and the back plate, wherein the first antenna and the second antenna are disposed inside the housing, and configured to transmit or receive a first signal passing through a portion of the housing and having a first wavelength with an external electronic device, respectively;
   an electric-wave blocking member including a first portion disposed between the back plate and the second antenna and overlapping the second antenna when viewed in the first direction; and a second portion extending from the first portion in a direction away from the back plate, overlapping the second antenna when viewed in a direction perpendicular to the first direction, and positioned further away from the portion of the housing than the second antenna; and
   at least one processor operatively connected with the first antenna and the second antenna,
   wherein the second antenna includes a first antenna pattern having a same shape as an antenna pattern of the first antenna; and a second antenna pattern extending in the first direction and at least partially overlapping the first antenna pattern when viewed in the direction perpendicular to the first direction, and
   wherein the second antenna pattern electrically connected with at least a portion of the first antenna pattern.

2. The electronic device of claim 1, wherein the second antenna pattern is directly connected or electrically coupled to the first antenna pattern.

3. The electronic device of claim 1, wherein a height of the electric-wave blocking member is substantially equal to the first wavelength.

4. The electronic device of claim 1, wherein a height of the electric-wave blocking member is substantially equal to half of the first wavelength.

5. The electronic device of claim 1, wherein a height of the electric-wave blocking member is substantially equal to a quarter of the first wavelength.

6. The electronic device of claim 1, wherein the first portion extends parallel to the back plate, and
   wherein the first portion and the second portion form a T-shape or L shape.

7. The electronic device of claim 6, further comprising:
   a printed circuit board on which the at least one processor is mounted,
   wherein the printed circuit board is disposed on an upper end portion of the housing, and
   wherein the second portion is disposed between the printed circuit board and the second antenna.

8. The electronic device of claim 1, wherein a separation distance between the second antenna and the door frame is equal to or greater than a reference distance when the electric-wave blocking member has a height smaller than or equal to a reference value.

9. The electronic device of claim 1, wherein a separation distance between the second antenna and the door frame is set to a first distance when the electric-wave blocking member has a same height as the back plate.

10. The electronic device of claim 9, wherein the separation distance is set to a second distance smaller than or equal to half of the first distance when the electric-wave blocking member has a height equal to the first wavelength.

11. The electronic device of claim 10, wherein the separation distance is set to a third distance smaller than the first distance and greater than the second distance when the height of the electric-wave blocking member is equal to half of the first wavelength.

* * * * *